US010608723B2

(12) United States Patent
Raghavan et al.

(10) Patent No.: US 10,608,723 B2
(45) Date of Patent: Mar. 31, 2020

(54) TECHNIQUES FOR ASSISTED BEAM REFINEMENT

(71) Applicant: QUALCOMM Incorporated, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/241,641

(22) Filed: Jan. 7, 2019

(65) Prior Publication Data

US 2019/0253117 A1    Aug. 15, 2019

Related U.S. Application Data

(60) Provisional application No. 62/631,042, filed on Feb. 15, 2018.

(51) Int. Cl.
*H04B 7/06* (2006.01)
*H04B 7/08* (2006.01)
(Continued)

(52) U.S. Cl.
CPC .......... *H04B 7/0623* (2013.01); *H04B 7/063* (2013.01); *H04B 7/065* (2013.01); *H04B 7/0617* (2013.01);
(Continued)

(58) Field of Classification Search
CPC .. H04B 17/327; H04B 17/336; H04B 17/382; H04B 7/0632; H04B 7/0478;
(Continued)

(56) References Cited

U.S. PATENT DOCUMENTS

2011/0159907 A1* 6/2011 Lee ...................... H04B 7/0417
455/509
2014/0099983 A1  4/2014 Sarca et al.
(Continued)

OTHER PUBLICATIONS

"3rd Generation Partnership Project; Technical Specification Group Radio Access Network; Study on New Radio (NR) Access Technology (Release 14)", 3GPP Standard ; Technical Specification ; 3GPP TR 38.912, 3rd Generation Partnership Project (3GPP), Mobile Competence Centre, 650, Route Des Lucioles, F-06921 Sophia-Antipolis Cedex, France, vol. TSG RAN, No. V1.0.0, Mar. 16, 2017, XP051290551, [retrieved on Mar. 16, 2017], pp. 1-73.
(Continued)

*Primary Examiner* — Khanh C Tran
(74) *Attorney, Agent, or Firm* — Holland & Hart LLP

(57) ABSTRACT

Techniques are described herein for a beam refinement procedure between a first communications device (e.g., base station) and a second communications device (e.g., user equipment (UE)) that uses long-term feedback information from the second communications device to maintain a beam pair link established for a downlink connection. The second communications device may transmit long-term feedback information to the first communications device in response to a request or a trigger event occurring. The long-term feedback information may be sensor information measured by the second communications device or uplink training symbols. The first communications device may localize a beam search of the beam refinement procedure using the long-term feedback information. The localized beam search may be an example of a device-specific search. The first communications device may also generate a long-term map of channel conditions based on the long-term feedback data. The long-term map may also be used to localize the search.

30 Claims, 17 Drawing Sheets

(51) Int. Cl.
  *H04B 17/382* (2015.01)
  *H04B 17/327* (2015.01)
  *H04B 17/336* (2015.01)
(52) U.S. Cl.
  CPC ......... *H04B 7/0632* (2013.01); *H04B 7/0634* (2013.01); *H04B 7/0834* (2013.01); *H04B 17/327* (2015.01); *H04B 17/336* (2015.01); *H04B 17/382* (2015.01)
(58) Field of Classification Search
  CPC .... H04B 7/0626; H04B 7/063; H04B 7/0417; H04B 7/0617; H04B 7/0623; H04B 7/0634; H04B 7/065; H04B 7/0834
  See application file for complete search history.

(56) References Cited

U.S. PATENT DOCUMENTS

| | | | | |
|---|---|---|---|---|
| 2016/0087769 | A1* | 3/2016 | Wild | H04B 7/065 370/329 |
| 2017/0366325 | A1* | 12/2017 | Kwak | H04L 1/0009 |
| 2018/0368142 | A1* | 12/2018 | Liou | H04W 72/0446 |
| 2019/0028158 | A1* | 1/2019 | Park | H04B 7/0478 |
| 2019/0268058 | A1* | 8/2019 | Park | H04B 7/0478 |
| 2019/0341981 | A1* | 11/2019 | Park | H04B 7/0478 |

OTHER PUBLICATIONS

Partial International Search Report—PCT/US2019/012614—ISA/EPO—Mar. 29, 2019 (181699WO).
ZTE: "On CSI Framework Details", 3GPP Draft; R1-1711607 on CSI Framework Details, 3rd Generation Partnership Project (3GPP), Mobile Competence Centre, 650, Route Des Lucioles, F-06921 Sophia-Antipolis Cedex, France, vol. RAN WG1, No. Qingdao, China; Jun. 27, 2017-Jun. 30, 2017, Jun. 26, 2017, XP051300779, Retrieved from the Internet: URL:http://www.3gpp.org/ftp/Meetings_3GPP_SYNC/RAN1/Docs/ [retrieved on Jun. 26, 2017], 14 pages.
International Search Report and Written Opinion—PCT/US2019/012614—ISA/EPO—May 22, 2019 (181699WO).

* cited by examiner

TECHNIQUES FOR ASSISTED BEAM REFINEMENT

CROSS REFERENCES

The present application for patent claims the benefit of U.S. Provisional Patent Application No. 62/631,042 by RAGHAVAN et al., entitled "TECHNIQUES FOR ASSISTED BEAM REFINEMENT," filed Feb. 15, 2018, assigned to the assignee hereof, and expressly incorporated herein.

BACKGROUND

The following relates generally to wireless communication, and more specifically to techniques for assisted beam refinement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some deployments (e.g., millimeter wave (mmW) deployments and some sub-6 GHz deployments), wireless devices may communicate using beamforming (e.g., directional transmission/reception) to shape or steer an antenna beam (e.g., a transmit beam or receive beam) along a spatial path. By using beamforming, wireless devices may be able to improve the chances that transmitted signals are received by a receiving device.

SUMMARY

The described techniques relate to improved methods, systems, devices, or apparatuses that support techniques for assisted beam refinement. Generally, the described techniques provide for a beam refinement procedure between a first communications device (e.g., a base station, a user equipment (UE), or the like) and a second communications device (e.g., a base station, a UE, or the like) that uses long-term feedback information from the second communications device to maintain a beam pair link established for a downlink connection. The second communications device may transmit long-term feedback information to the first communications device in response to a request or a trigger event occurring. The long-term feedback information may be sensor information measured by the second communications device or uplink training symbols. The first communications device may localize a beam search of the beam refinement procedure using the long-term feedback information. The localized beam search may be an example of a device-specific search (e.g., a UE-specific search). The first communications device may also generate a long-term map of channel conditions based on the long-term feedback data. The long-term map may also be used to localize the search.

A method of wireless communication is described. The method may include identifying one or more beam pair links between a first communications device and a second communications device. The one or more beam pair links are established using a beam management procedure, receiving long-term feedback information from the second communications device after the one or more beam pair links are established using the beam management procedure, identifying a subset of directional downlink beams to use in a device-specific short-term downlink beam refinement procedure (e.g., a UE-specific short-term downlink beam refinement procedure) implemented by the first communications device based at least in part on receiving the long-term feedback information from the second communications device, and performing the device-specific short-term downlink beam refinement procedure using the subset of directional downlink beams.

An apparatus for wireless communication is described. The apparatus may include means for identifying one or more beam pair links between a first communications device and a second communications device. The one or more beam pair links are established using a beam management procedure, means for receiving long-term feedback information from the second communications device after the one or more beam pair links are established using the beam management procedure, means for identifying a subset of directional downlink beams to use in a device-specific short-term downlink beam refinement procedure implemented by the first communications device based at least in part on receiving the long-term feedback information from the second communications device, and means for performing the device-specific short-term downlink beam refinement procedure using the subset of directional downlink beams.

Another apparatus for wireless communication is described. The apparatus may include a processor, memory in electronic communication with the processor, and instructions stored in the memory. The instructions may be operable to cause the processor to identify one or more beam pair links between a first communications device and a second communications device. The one or more beam pair links are established using a beam management procedure, receive long-term feedback information from the second communications device after the one or more beam pair links are established using the beam management procedure, identify a subset of directional downlink beams to use in a device-specific short-term downlink beam refinement procedure implemented by the first communications device based at least in part on receiving the long-term feedback information from the second communications device, and perform the device-specific short-term downlink beam refinement procedure using the subset of directional downlink beams.

A non-transitory computer-readable medium for wireless communication is described. The non-transitory computer-readable medium may include instructions operable to cause a processor to identify one or more beam pair links between a first communications device and a second communications device. The one or more beam pair links are established using a beam management procedure, receive long-term feedback information from the second communications device after the one or more beam pair links are established using the beam management procedure, identify a subset of directional downlink beams to use in a device-specific short-term downlink beam refinement procedure implemented by the first communications device based at least in part on receiving the long-term feedback information from the second communications device, and perform the device-specific short-term downlink beam refinement procedure using the subset of directional downlink beams.

Some examples of the method, apparatus, and non-transitory computer-readable medium described herein may further include processes, features, means, or instructions for localizing a search for the device-specific short-term downlink beam refinement procedure based at least in part on receiving the long-term feedback information. Performing the device-specific short-term downlink beam refinement procedure may be based at least in part on localizing the search.

In some examples of the method, apparatus, and non-transitory computer-readable medium described herein, the long-term feedback information includes information about a position of the second communications device in a coverage area of the first communications device, the information being measured by one or more sensors of the second communications device.

In some examples of the method, apparatus, and non-transitory computer-readable medium described herein, the information includes one or more of global positioning system (GPS) data, accelerometer data, or gyroscope data.

In some examples of the method, apparatus, and non-transitory computer-readable medium described herein, the long-term feedback information includes a plurality of uplink training symbols transmitted by the second communications device.

Some examples of the method, apparatus, and non-transitory computer-readable medium described herein may further include processes, features, means, or instructions for performing a long-term channel estimation based at least in part on receiving the plurality of uplink training symbols. Identifying the subset of directional downlink beams may be based at least in part on performing the long-term channel estimation.

In some examples of the method, apparatus, and non-transitory computer-readable medium described herein, the beam management procedure includes a set of one or more L1/L2 procedures to acquire or maintain a set of one or more transmission reception points (TRxPs), or second communications device beams.

In some examples of the method, apparatus, and non-transitory computer-readable medium described herein, the beam management procedure may be a P-1/2/3 beam management procedure.

Some examples of the method, apparatus, and non-transitory computer-readable medium described herein may further include processes, features, means, or instructions for generating a long-term map of a channel environment of the first communications device using the long-term feedback information received from the second communications device. The long-term map indicates historical conditions of the channel environment learned from the long-term feedback information received from the second communications device and other long-term feedback information received previously from a plurality of second communications devices.

Some examples of the method, apparatus, and non-transitory computer-readable medium described herein may further include processes, features, means, or instructions for localizing a search for the device-specific short-term downlink beam refinement procedure based at least in part on the long-term feedback information received from the second communications device and the long-term map of the channel environment.

In some examples of the method, apparatus, and non-transitory computer-readable medium described herein, the long-term map of the channel environment may be a statistical covariance matrix configured to indicate historical fading conditions of a channel matrix.

Some examples of the method, apparatus, and non-transitory computer-readable medium described herein may further include processes, features, means, or instructions for transmitting a message to the second communications device requesting the long-term feedback information. Receiving the long-term feedback information may be based at least in part on transmitting the message.

Some examples of the method, apparatus, and non-transitory computer-readable medium described herein may further include processes, features, means, or instructions for identifying a trigger event for initiating the device-specific short-term downlink beam refinement procedure for the one or more beam pair links established using the beam management procedure. Identifying the subset of directional downlink beams may be based at least in part on collecting long-term information after identifying the trigger event.

Some examples of the method, apparatus, and non-transitory computer-readable medium described herein may further include processes, features, means, or instructions for receiving, from the second communications device, channel quality indicator (CQI) information or beam indices information about one or more directional beams of the one or more beam pair links. Identifying the trigger event may be based at least in part on receiving the CQI information or the beam indices information.

Some examples of the method, apparatus, and non-transitory computer-readable medium described herein may further include processes, features, means, or instructions for determining that a change in the CQI information or the beam indices information as compared to previous CQI information or previous beam indices information satisfies a predetermined criteria. Identifying the trigger event may be based at least in part on determining that the change in the CQI information or the beam indices information satisfies the predetermined criteria.

In some examples of the method, apparatus, and non-transitory computer-readable medium described herein, the CQI information for a plurality of beam indices includes one or more of a reference signal receive power (RSRP), a reference signal received quality (RSRQ), a signal-to-noise ratio (SNR), or a signal-to-interference and noise ratio (SINR).

A method of wireless communication is described. The method may include identifying one or more beam pair links between a first communications device and a second communications device. The one or more beam pair links are established using a beam management procedure, transmitting long-term feedback information to the first communications device after the one or more beam pair links are established using the beam management procedure, receiving instructions from the first communications device regarding a device-specific short-term downlink beam refinement procedure based at least in part on transmitting the long-term feedback information, and performing the device-specific short-term downlink beam refinement procedure based at least in part on receiving the instructions.

An apparatus for wireless communication is described. The apparatus may include means for identifying one or more beam pair links between a first communications device and a second communications device. The one or more beam pair links are established using a beam management procedure, means for transmitting long-term feedback information to the first communications device after the one or more beam pair links are established using the beam management procedure, means for receiving instructions from the first communications device regarding a device-specific short-term downlink beam refinement procedure based at least in part on transmitting the long-term feedback information, and means for performing the device-specific short-term downlink beam refinement procedure based at least in part on receiving the instructions.

Another apparatus for wireless communication is described. The apparatus may include a processor, memory in electronic communication with the processor, and instructions stored in the memory. The instructions may be operable to cause the processor to identify one or more beam pair links between a first communications device and a second communications device. The one or more beam pair links are established using a beam management procedure, transmit long-term feedback information to the first communications device after the one or more beam pair links are established using the beam management procedure, receive instructions from the first communications device regarding a device-specific short-term downlink beam refinement procedure based at least in part on transmitting the long-term feedback information, and perform the device-specific short-term downlink beam refinement procedure based at least in part on receiving the instructions.

A non-transitory computer-readable medium for wireless communication is described. The non-transitory computer-readable medium may include instructions operable to cause a processor to identify one or more beam pair links between a first communications device and a second communications device. The one or more beam pair links are established using a beam management procedure, transmit long-term feedback information to the first communications device after the one or more beam pair links are established using the beam management procedure, receive instructions from the first communications device regarding a device-specific short-term downlink beam refinement procedure based at least in part on transmitting the long-term feedback information, and perform the device-specific short-term downlink beam refinement procedure based at least in part on receiving the instructions.

Some examples of the method, apparatus, and non-transitory computer-readable medium described herein may further include processes, features, means, or instructions for measuring a position of the second communications device in a coverage area of the first communications device using one or more sensors. The long-term feedback information includes information about the position of the second communications device.

In some examples of the method, apparatus, and non-transitory computer-readable medium described herein, the information includes one or more of global positioning system (GPS) data, accelerometer data, or gyroscope data.

Some examples of the method, apparatus, and non-transitory computer-readable medium described herein may further include processes, features, means, or instructions for transmitting a plurality of uplink training symbols to the first communications device, the plurality of uplink training symbols configured to provide the first communications device with channel estimation data. The long-term feedback information includes the plurality of uplink training symbols.

In some examples of the method, apparatus, and non-transitory computer-readable medium described herein, the beam management procedure includes a set of one or more L1/L2 procedures to acquire or maintain a set of one or more transmission reception points (TRxPs), or second communications device beams.

In some examples of the method, apparatus, and non-transitory computer-readable medium described herein, the beam management procedure may be a P-1/2/3 beam management procedure.

Some examples of the method, apparatus, and non-transitory computer-readable medium described herein may further include processes, features, means, or instructions for identifying a trigger event for initiating the device-specific short-term downlink beam refinement procedure after the one or more beam pair links may be established using the beam management procedure. Transmitting the long-term feedback information may be based at least in part on identifying the trigger event.

Some examples of the method, apparatus, and non-transitory computer-readable medium described herein may further include processes, features, means, or instructions for transmitting, to the first communications device, channel quality indicator (CQI) information about one or more directional beams of the one or more beam pair links.

Some examples of the method, apparatus, and non-transitory computer-readable medium described herein may further include processes, features, means, or instructions for determining that a change in the CQI information as compared to previous CQI information satisfies a predetermined criteria. Identifying the trigger event may be based at least in part on determining that the change in the CQI information satisfies the predetermined criteria.

In some examples of the method, apparatus, and non-transitory computer-readable medium described herein, the CQI information for a plurality of beam indices includes one or more of a reference signal receive power (RSRP), a reference signal received quality (RSRQ), a signal-to-noise ratio (SNR), or a signal-to-interference and noise ratio (SINR).

Some examples of the method, apparatus, and non-transitory computer-readable medium described herein may further include processes, features, means, or instructions for receiving a message to the second communications device requesting the long-term feedback information. Transmitting the long-term feedback information may be based at least in part on receiving the message.

DETAILED DESCRIPTION

In some wireless communications, in order to establish a beam pair link between a first communications device (e.g., a base station, a UE, or the like) and a second communications device (e.g., a base station, a UE, or the like), a directional transmission beam and a directional listening configuration may be aligned. Changing channel conditions due to a variety of factors, including a UE moving throughout the coverage area of a base station, may cause the directional transmission beam to become misaligned from the directional listening configuration. If this misalignment becomes too great, the beam pair link may experience a radio link failure event that may cause the UE to become communicatively disconnected from the base station. To avoid radio link failure events, the base station and the UE may periodically perform beam refinement procedures.

Techniques are described herein for a beam refinement procedure between a first communications device such as a base station and a second communications device such as a UE. Although, aspects of the present disclosure primarily describe the disclosed beam refinement procedures with respect to a base station representing a first communication device and a UE representing a second communication device, this description is only provided by way of example. Accordingly, aspects include but are not limited to beam refinement procedures between two base stations, two UEs, and a UE as the first communications device and a base station as the second communications device. Techniques include beam refinement procedures that use long-term feedback information from a UE to maintain a beam pair link established for a downlink connection. The UE may transmit long-term feedback information to the base station in response to a request or a trigger event occurring. The long-term feedback information may be sensor information measured by the UE or uplink training symbols. The base station may localize a beam search of the beam refinement procedure using the long-term feedback information. The localized beam search may be an example of a device-specific search (e.g., a UE-specific search). The base station may also generate a long-term map of channel conditions based on the long-term feedback data. The long-term map may also be used to localize the search.

Aspects of the disclosure are initially described in the context of a wireless communications system. Aspects of the disclosure are illustrated by and described with reference to communication schemes and process flows. Aspects of the disclosure are further illustrated by and described with reference to apparatus diagrams, system diagrams, and flowcharts that relate to techniques for assisted beam refinement.

Figure 1:
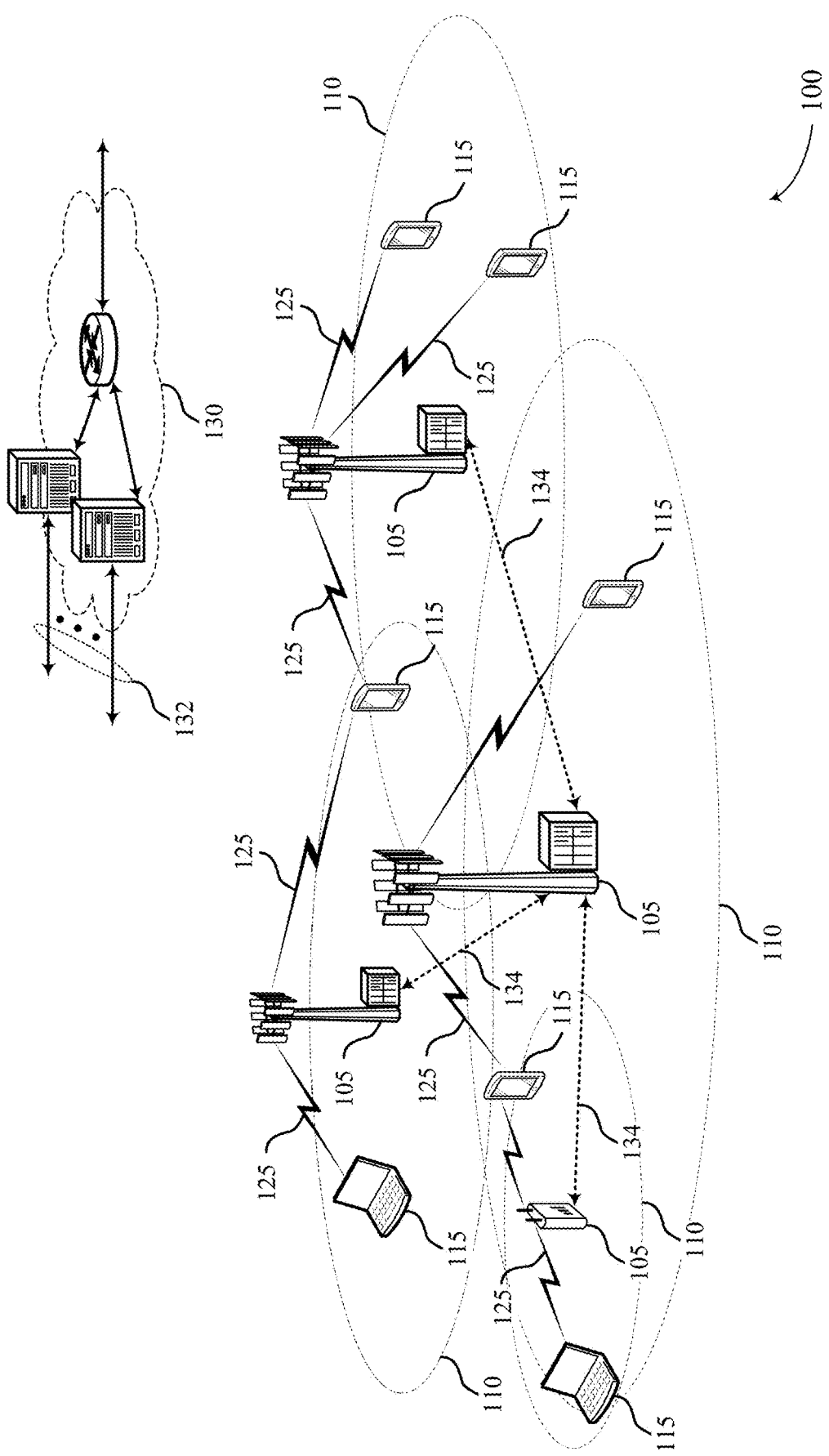
FIG. 1 illustrates an example of a system for wireless communication that supports techniques for assisted beam refinement in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Base station 105 and UEs 115 may use a beam refinement procedure to maintain a beam pair link. A UE-specific beam refinement procedure may be implemented by the base station 105 and/or UE 115 that uses long-term feedback information from a UE to maintain the beam pair link established for a downlink connection. Such a UE-specific beam refinement procedure may reduce the amount of communication resources used over other beam refinement procedures and reduce latency as compared to other beam refinement procedures.

Figure 2:
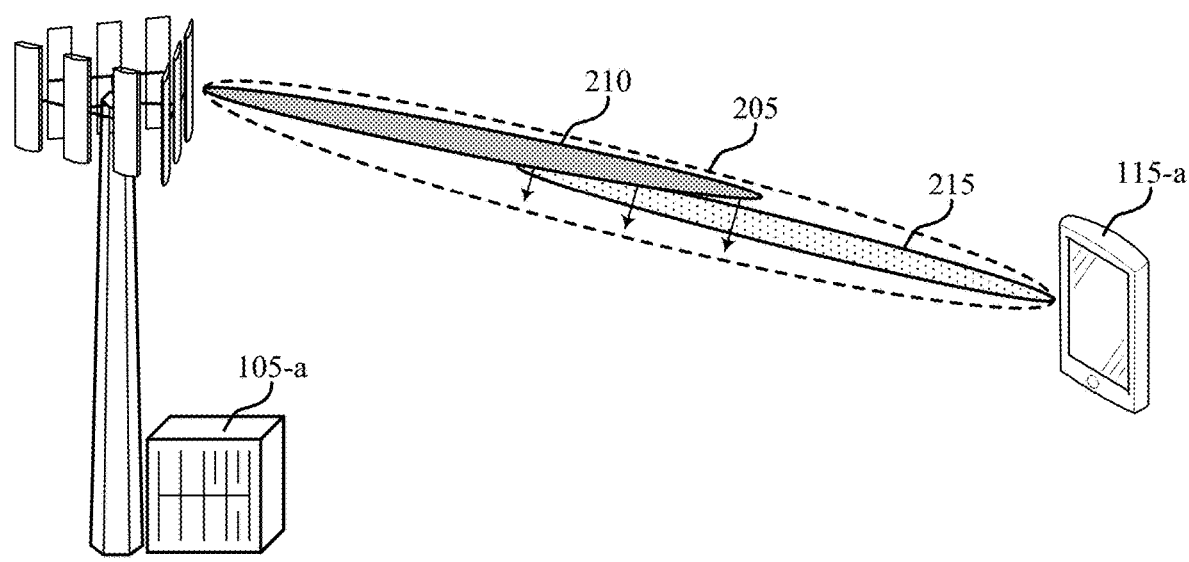
FIG. 2 illustrates an example of a wireless communications system that supports techniques for assisted beam refinement in accordance with aspects of the present disclosure.

FIG. 2 illustrates an example of a wireless communications system 200 that supports techniques for assisted beam refinement in accordance with various aspects of the present disclosure. The wireless communications system 200 may include a first communications device (e.g., base station 105-*a*) and a second communications device (e.g., UE 115-*a*), which may be examples of a base station 105 or a UE 115 described with reference to FIG. 1. The wireless communications system 200 illustrates a device-specific (e.g., a UE-specific) downlink beam refinement procedure where the base station 105-*a* may use feedback information received from the UE 115-*a* to refine a beam pair link 205 for the downlink.

Some wireless communications systems 200 may support millimeter wave (mmW) networks that use beam pair links (e.g., beam pair link 205) to establish communication links. The beam pair link 205 may include a directional transmission beam 210 and a directional listening configuration 215. While the wireless communications system 200 illustrates a beam pair link 205 for downlink communications, in other examples, beam pair links may be used for uplink communications where the UE 115-*a* transmits using a directional transmission beam and the base station 105-*a* listens using a directional listening configuration.

To establish communication link between the base station 105-*a* and the UE 115-*a* via the beam pair link 205, the directional transmission beam 210 and the directional listening configuration 215 should be aligned. Changing channel conditions due to a variety of factors, including the UE 115-*a* moving throughout the coverage area of the base station 105-*a* or changing interference conditions, may cause the directional transmission beam 210 to become misaligned from the directional listening configuration 215. If this misalignment becomes too great, the beam pair link 205 may experience a radio link failure event that causes the UE 115-*a* to become communicatively disconnected from the base station 105-*a*. Techniques are described herein for a UE-specific downlink beam refinement procedure that maintains a beam pair link that has already been established using feedback information for the UE 115-*a*.

Figure 3:
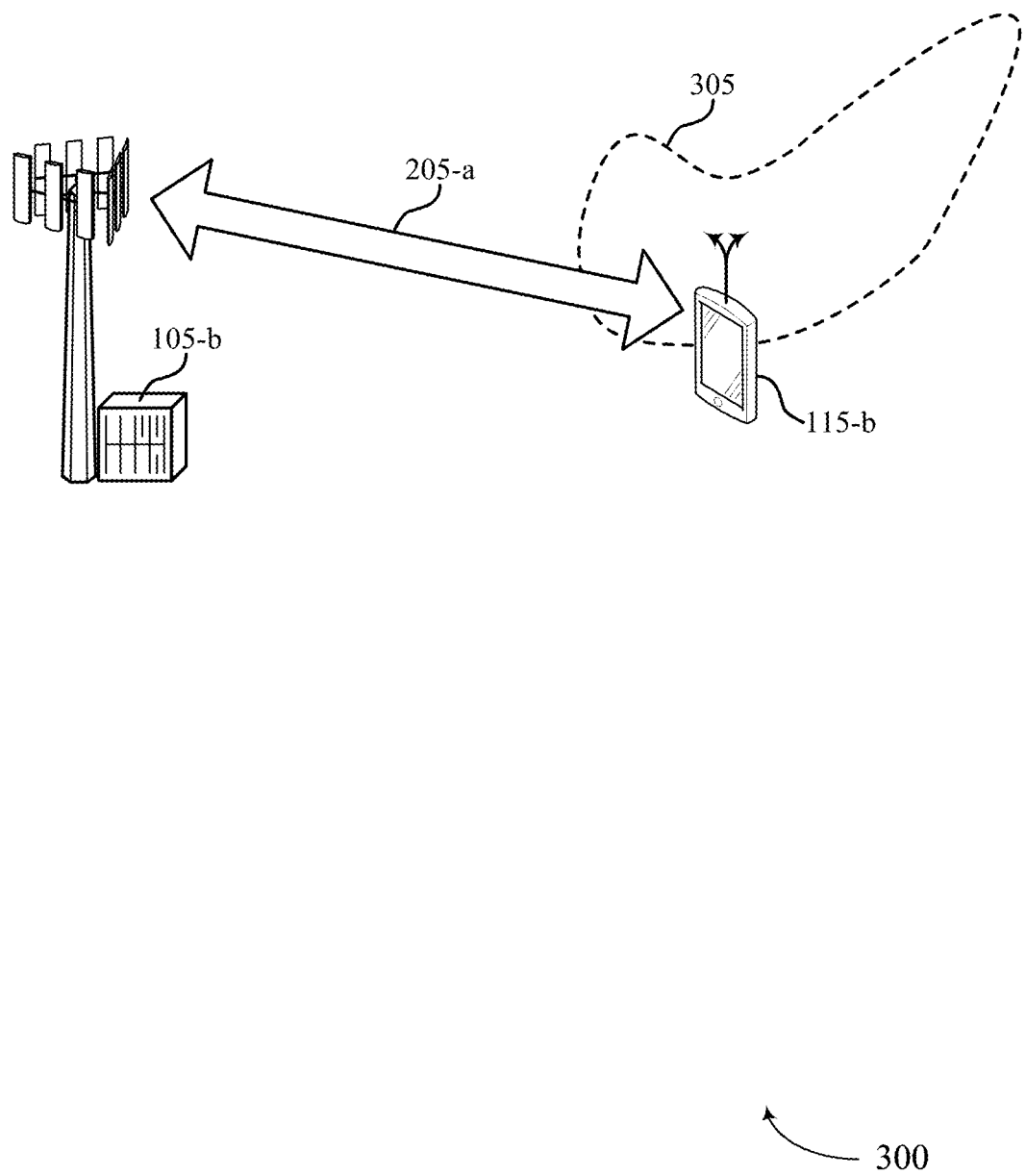
FIG. 3 illustrates an example of a wireless communications system that supports techniques for assisted beam refinement in accordance with aspects of the present disclosure.

FIG. 3 illustrates an example of a wireless communications system 300 that supports techniques for assisted beam refinement in accordance with various aspects of the present disclosure. The wireless communications system 300 may be an example of the wireless communications systems 100 and 200 described with reference to FIGS. 1 and 2. The wireless communications system 300 illustrates a localized search pattern 305 generated as part of a device-specific (e.g., a UE-specific) downlink beam refinement procedure.

In many beam refinement procedures of a beam pair link 205-a, a first communications device such as the base station 105-b may transmit a plurality of reference signals in a plurality of directions. A second communications device such as the UE 115-b may determine which reference signals is the desired reference signal by measuring a channel quality parameter of the reference signals that are received. In some cases, the plurality of directions selected to be part of the search pattern may be distributed uniformly around the current direction of the current directional transmission beam.

Using feedback information from the UE 115-b, the base station 105-b may localize the search pattern for a beam refinement procedure. This may reduce the amount of communication resources used for a beam refinement procedure and make more communication resources available for communicating information between the base station 105-b and the UE 115-b. The benefits of a localized search pattern may be illustrated by an example. When a UE 115-b is at a particular location in the coverage area of the base station 105-b, not all directions of travel of the UE 115-b may be equally as likely. The UE 115-b may be moving along a road making one or two different directions of travel much more likely than other directions of travel. Based on long-term learning and feedback information from various UEs, the base station 105-b may generate a localized search pattern 305 that is non-uniform, but that is based on the most likely directions of travel of the UE 115-b. In some cases, the localized search pattern 305 may be generated by side beam search seeding.

Figure 4:
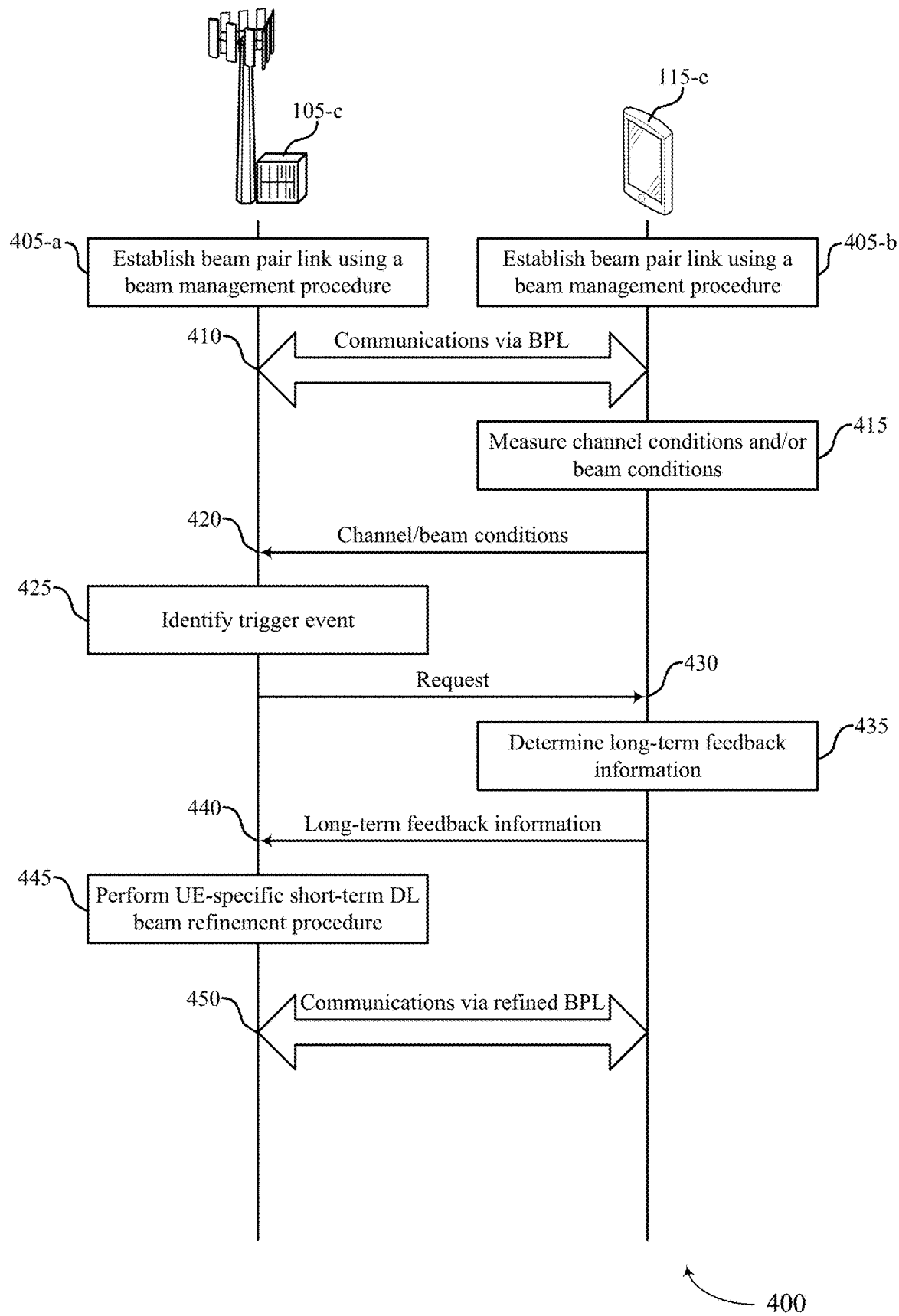
FIG. 4 illustrates an example of a communication scheme that supports techniques for assisted beam refinement in accordance with aspects of the present disclosure.

FIG. 4 illustrates an example of a communication scheme 400 that supports techniques for assisted beam refinement in accordance with various aspects of the present disclosure. The communication scheme 400 may be implemented using one or more of the wireless communications systems 100, 200, 300 described with reference to FIGS. 1-3. The communication scheme 400 illustrates functions and communications that may occur as part of a device-specific downlink beam refinement procedure such as a UE-specific downlink beam refinement procedure. The communication scheme 400 includes functions and communications implemented by a first communications device such as base station 105-c and a second communications device such as UE 115-c in the context of a downlink beam pair link, which may be examples of the base stations 105 and UEs 115 described with reference to FIGS. 1-3. In an uplink context, some of the functions and communications described herein may be modified accordingly.

At blocks 405-a and 405-b, the base station 105-c and the UE 115-c may establish a beam pair link using a beam management procedure. In some cases, the beam management procedure may include a set of one or more L1/L2 procedures to acquire or maintain a set of one or more transmission reception points (TRxPs), communications device beams (e.g., UE beams), or a combination thereof. In some cases, the beam management procedure may be an example P-1/2/3 procedure. For example, a P1 procedure may be used to enable UE measurement on different TRxP Tx beams to support selection of TRxP Tx beams/UE Rx beam(s); a P2 procedure may be used to enable UE measurement on different TRxP Tx beams to possibly change inter/intra-TRxP Tx beam(s); and a P3 procedure may be used to enable UE measurement on the same TRxP Tx beam to change UE Rx beam in the case UE uses beamforming.

The UE-specific downlink beam refinement procedure described herein is different from these examples of the beam management procedure. In some cases, the UE-specific downlink beam refinement procedure may be performed after a communication link has been established using one or more of these beam management procedures. Various aspects of the beam management procedures may be performed by either the base station 105-c or the UE 115-c or both. The base station 105-c or the UE 115-c may identify that a beam pair link has been established between the base station 105-c and the UE 115-c using the beam management procedure.

Once the beam pair link has been established, the base station 105-c and the UE 115-c may communicate information via the beam pair link at 410. If the beam pair link is for downlink communications, the base station 105-c may transmit information to the UE 115-c. If the beam pair link is for uplink communications, the UE 115-c may transmit information to the base station 105-c.

At block 415, the UE 115-c may measure channel conditions and/or beam conditions associated with the beam pair link and report those channel/beam conditions 420 to the base station 105-c. The channel/beam conditions 420 may be channel quality indicator (CQI) information about one or more directional beams of one or more beam pair links. The channel/beam conditions 420 may include beam indices of the one or more directional beams. In some cases, the channel/beam conditions 420 measured and reported by the UE 115-c may include a reference signal received power (RSRP), a reference signal received quality (RSRQ), a signal-to-noise ratio (SNR), a signal-to-interference and noise ratio (SINR), or a combination thereof.

At block 425, the base station 105-c may identify a trigger event for initiating the UE-specific downlink beam refinement procedure for at least one of the beam pair links established using the beam management procedure. As part of the procedure, the identified trigger event may also initiate a feedback request 430 to the UE 115-c for feedback information regarding at least a portion of the one or more beam pair links. To identify the trigger event, the base station 105-c may determine that a change in the CQI information as compared to previous CQI information satisfies a predetermined criteria. In some cases, the base station 105-c may determine that a change in beam indices information of the beam pair link as compared to previous beam indices information satisfies a pre-determined criteria. If any of the criteria is satisfied, the base station 105-c may determine that the trigger event has occurred.

The request 430 may include a request for the UE 115-c to provide sensor information to the base station 105-c. The request 430 may be a request for data for a single instant in time or it may be a request for a series of measurements be taken and reported over a period of time. For example, when the base station 105-c changes a beam, the base station 105-c may request information from the UE 115-c on which sensor information has changed as a result of the beam changing.

In some cases, the identifying of the trigger event may be performed by the UE 115-c and the UE 115-c may signal that occurrence of the trigger event through some type of signaling. In such cases, the base station 105-c may identify the trigger event based at least in part on receiving a message from the UE 115-c. In these cases, the request 430 may not be transmitted to the UE 115-c because the UE 115-c already knows that the trigger event has been identified.

At block 435, the UE 115-c may determine long-term feedback information 440 for use during the UE-specific downlink beam refinement procedure and report the long-term feedback information 440 to the base station 105-*c*. Examples of long-term feedback information 440 may include sensor data measured by the UE 115-*c*, small-scale fading information, CQI information, beam indices, other measurements of channel conditions, or various combinations thereof, all of which may be accumulated and/or processed over a long time period. Examples of the sensor data measured by the UE 115-*c* may include position sensor data (e.g., GPS, Glonass, or other positioning data), accelerometer data, light sensor data, sonic data, RF signal sensor data (e.g., Bluetooth, Wi-Fi, and/or cellular RF signals), gyroscopic data, or a combination thereof. In one embodiment, the sensor data may be periodically fed back to the base station 105-*c* so that the base station can adapt beam selection or other transmission parameters to the current sensor data of the UE 115-*c*. For example, the current sensor data may be used to limit the search space to locate a best available beam or optimal beam, or identify other parameters for a downlink transmission.

Long-term feedback information 440 may be used for learning channel statistics. The long-term feedback information 440 may be used by the base station 105-*c* to create a mapping of a channel environment of the coverage area of the base station 105-*c*. As used herein, the term long-term may refer to information and/or procedures that occur over a relatively long duration of time. As used herein, the term short-term may refer to information and/or procedures that occur over a relatively short duration of time. For example, short-term information may refer to information captured at a particular instant (e.g., symbol or subframe level), while long-term information may refer to information that encompasses data captured over a duration that is longer (e.g., tens or hundreds of symbols or subframes) than the particular instant of the short-term information.

At block 445, the base station 105-*c* may perform the UE-specific downlink beam refinement procedure. In some cases, the UE-specific downlink beam refinement procedure may be referred as a UE-specific short-term downlink beam refinement procedure because the procedure may refer to small refinements to the beam pair link. The UE-specific downlink beam refinement procedure may utilize the long-term feedback information to adjust downlink transmission beams used by the base station 105-*c*. In some examples, the UE-specific beam refinement procedure may be applied to uplink transmission beams as well. The UE-specific downlink beam refinement procedure may be performed on a UE-by-UE basis, rather than being conducted for more than one UE at a time. The UE-specific procedure may be targeted to a single, known UE 115-*c* that already has established a beam pair link with the base station 105-*c*. The UE-specific downlink beam refinement procedure may include long-term decision-making and short-term decision-making. As is described in more detail with reference to FIG. 5, the base station 105-*c* may extract useful features, such as channel conditions, from the long-term feedback information 440 using machine-learning algorithms, deep-learning algorithms, neural networks, or advanced signal processing methods for use by other UEs at a later time.

As part of the UE-specific downlink beam refinement procedure, the base station 105-*c* may adjust the downlink transmission beam or other aspects of the beam pair link. Once the beam pair link has been refined, the base station 105-*c* and the UE 115-*c* may communicate information via the refined beam pair link at 450. If the refined beam pair link is for downlink communications, the base station 105-*c* may transmit information to the UE 115-*c*. If the refined beam pair link is for uplink communications, the UE 115-*c* may transmit information to the base station 105-*c*. The UE 115-*c* may continue to feedback sensor information or other long-term feedback information and the base station 105-*c* may continue to adapt the beam pair link or other parameters of a transmission based on the feedback, as part of the beam refinement procedure.

Figure 5:
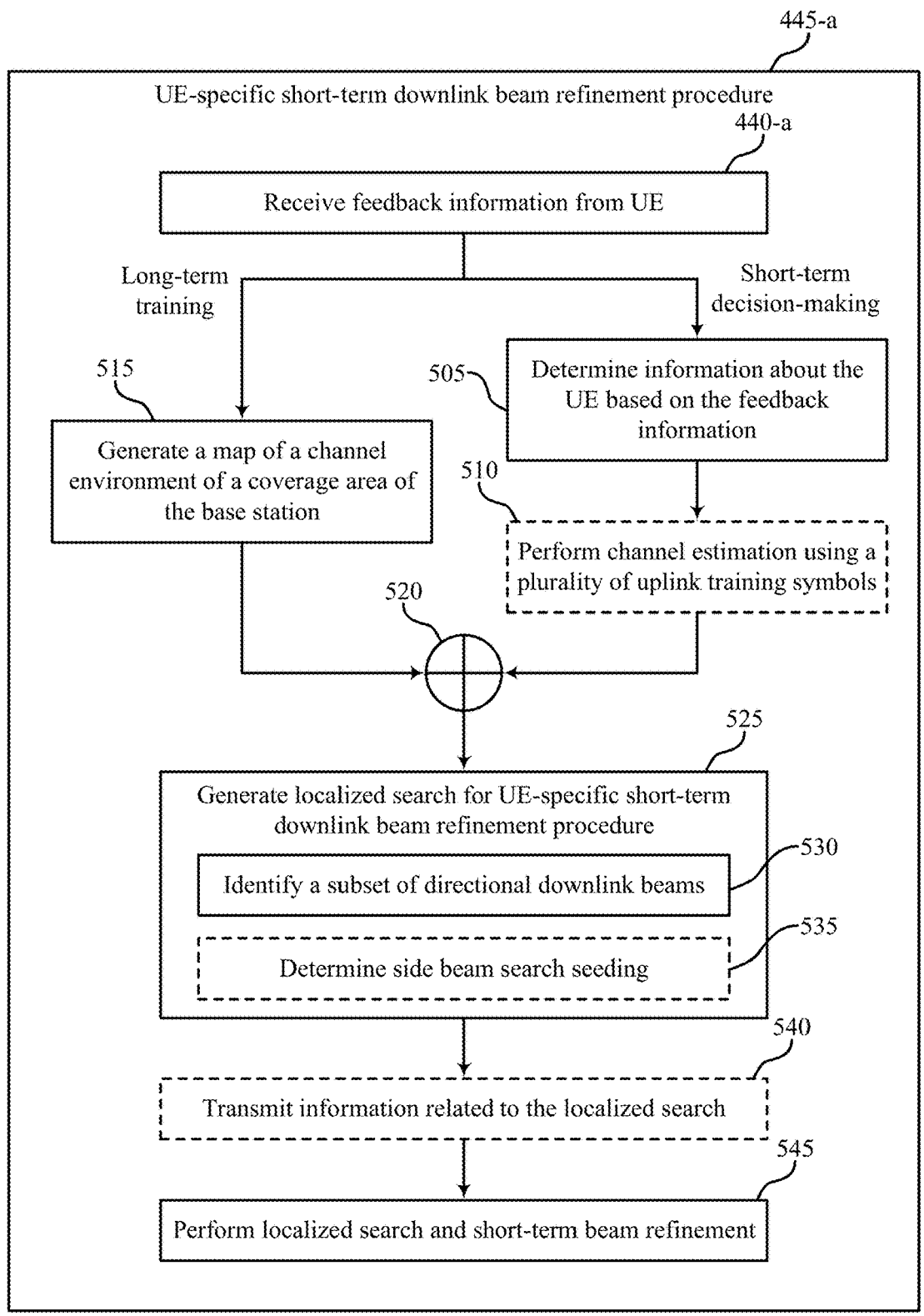
FIG. 5 illustrates an example of a process flow that supports techniques for assisted beam refinement in accordance with aspects of the present disclosure.

FIG. 5 illustrates an example of a process flow 500 that supports techniques for assisted beam refinement in accordance with various aspects of the present disclosure. The process flow 500 illustrates a process that may occur as part of a first communications device such as the base station 105-*c* performing a device-specific (e.g., UE-specific) downlink beam refinement procedure at block 445-*a* as described in FIG. 4. As such, in some cases, the functions and communications described in the process flow 500 may be considered part of the communication scheme 400. The process flow 500 may be implemented using one or more of the wireless communications systems 100, 200, 300 described with reference to FIGS. 1-3. The process flow 500 includes functions and communications implemented by a first communications device (e.g., base station 105-*c*) and a second communications device (e.g., UE 115-*c*) in the context of a downlink beam pair link. In an uplink context, some of the functions and communications described herein may be modified accordingly.

Upon receiving the long-term feedback information 440-*a* from the UE 115-*c*, the base station 105-*c* may engage in short-term decision-making and/or long-term training using the feedback information. The short-term decision-making may relate to refining one or more beams in one or more beam pair links established between the base station 105-*c* and the UE 115-*c*. The long-term training may relate to using long-term feedback information to generate a map of a channel environment that may be used to predict movements of UEs in the coverage area.

At block 505, the base station 105-*c* may determine information about the UE 115-*c* based on the feedback information. For example, the base station 105-*c* may determine the position and/or orientation of the UE 115-*c* in space using sensor information received from the UE 115-*c*. The base station 105-*c* may also determine a route of travel and one or more predicted routes of travel based on the sensor information and other historical sensor information. Using the sensor information, the base station 105-*c* may be configured to perform the UE-specific downlink beam refinement procedure.

At block 510, the base station 105-*c* may optionally perform channel estimation using a plurality of uplink training symbols transmitted by the UE 115-*c*. In some cases, the long-term feedback information 440 transmitted by the UE 115-*c* may include uplink training symbols. The base station 105-*c* may determine small-scale fading information based on receiving the uplink training symbols. For example, the base station 105-*c* may generate a covariance matrix that captures channel conditions of the downlink beam pair links based on the uplink training symbols. The base station 105-*c* may use the covariance matrix information (e.g., eigen-space information) to generate the localized search pattern for the beam sweep procedure of the UE-specific downlink beam refinement procedure.

In some cases, the base station 105-*c* may use the long-term feedback information 440-*a* received from the UE 115-*c* as part of long-term training. At block 515, the base station 105-*c* may generate a map of a channel environment of the coverage area of the base station 105-*c* using the long-term feedback information 440-*a*. As the base station 105-*c* collects feedback information from a plurality of UEs and/or other sources, the base station 105-*c* may use machine-learning algorithms, deep-learning algorithms, or neural networks to identify patterns in the feedback information. For example, the map of the channel environment may indicate, for a given current position and current velocity of the UE 115-*c*, what are the likely future positions and/or future velocities of the UE 115-*c*. Such a situation may be described relative to real-world examples. Many UEs may travel down roads with their user. When traveling down a road, the UE's ability to move through space may be constrained by the road, road conditions, traffic conditions, or other factors. As such, not all directions of travel are equally likely given a current position of the UE 115-*c*, some future positions and future velocities may be more likely based on being part of a likely route of travel of the UE 115-*c*. As a further example, the map of the channel environment may correlate specific beams, or specific sets of beams, with the sensor data of the UE 115-*c*. For example, when the UE 115-*c* is in a vertical orientation as opposed to a horizontal orientation a different set of beams may be more likely to provide good data throughput. Similarly, different variations in angles, temperatures, light levels, or any other information obtained through sensor data may correlate with a reduced search space for the beam such that an optimal beam can be located more quickly. For example, because blockage by a user's hand may result in high attenuation for mmW transmission, the sensor or feedback information may allow for a better understanding of what orientation, positions, or other sensor data correlate to which beam angles.

The base station 105-*c* may use sensor information and/or uplink training symbols to generate a map of predicted UE paths and/or likely future conditions (e.g., future position and/or orientation of the UE) based on current conditions (e.g., current position and/or orientation of the UE). Such a map of channel conditions may be used to generate localized searches during the UE-specific downlink beam refinement procedure. The map may indicate historical conditions of the channel environment learned from feedback information learned from a plurality of UEs. The map may also indicate sets of predicted future conditions based on current conditions. For example, if the long-term feedback information 440-*a* indicates that a certain condition exists at the UE 115-*c*, the base station 105-*c* may be configured to determine likely future conditions using the map. With this predictive information, the base station 105-*c* may be configured to generate localized, and sometimes non-uniform, search patterns for the beam refinement procedure. In some cases, the map of the channel conditions may be a statistical covariance matrix configured to indicate historical fading conditions in the channel matrix.

At block 520, the base station 105-*c* may determine whether to use the long-term map information when determining the search pattern for the UE-specific downlink beam refinement procedure. The base station 105-*c* may use sensor data from the UE 115-*c*, uplink training symbols from the UE 115-*c*, long-term mapping data, or various combinations thereof to determine the localized search patterns. In some cases, the base station 105-*c* may not use the long-term map information during the beam refinement procedure.

At block 525, the base station 105-*c* may generate a localized search for the UE-specific short-term downlink beam refinement procedure based on the long-term feedback information 440-*a* and/or the long-term map of channel conditions. To generate the localized search, the base station 105-*c* may, at block 530, identify a subset of directional downlink beams and/or a subset of directions to transmit reference beams during a beam sweep. The subset of directional downlink beams may be selected to provide a more narrow search area than other beam sweep procedures used in beam refinement. The search area of the beam sweep may be more narrow or localized because the subset of directional downlink beams is UE-specific (i.e., generated for a specific UE) and/or the search area of the beam sweep may be based on sensor information or uplink training symbols from the specific UE. In some cases, the base station 105-*c* may, at block 535, use the long-term feedback information 440-*a* and/or long-term map information to determine side beam search seeding for the search pattern.

At block 540, the base station 105-*c* may transmit information related to the localized search to the UE 115-*c* using one or more of the existing beam pair links. In such a situation, the UE 115-*c* may be configured to localize its search pattern for listening based on the localized search pattern for transmitting in the downlink.

At block 545, the base station 105-*c* may perform a localized search and may perform the short-term beam refinement procedure. The base station 105-*c* may transmit one or more reference signals in the plurality of directions specified in the localized search. The UE 115-*c* may measure channel conditions for each reference signal and report to the base station 105-*c* which reference signal had the desired channel conditions. In some cases, the channel conditions of the reference signals may be compared to the channel conditions of the existing beam pair link. If the channel conditions of one or more reference signals satisfy a predetermined criteria (e.g., are better than the beam pair link), the base station 105-*c* and/or the UE 115-*c* may adjust the beam pair link to use the new directional transmission beam that is associated with the desired reference signal. In such a manner, the base station 105-*c* and the UE 115-*c* may maintain the beam pair link and maintain communicative communication between the base station 105-*c* and the UE 115-*c* using a UE-specific short-term downlink beam refinement procedure that uses UE sensor data, training symbols, and long-term mapping data.

Figure 6:
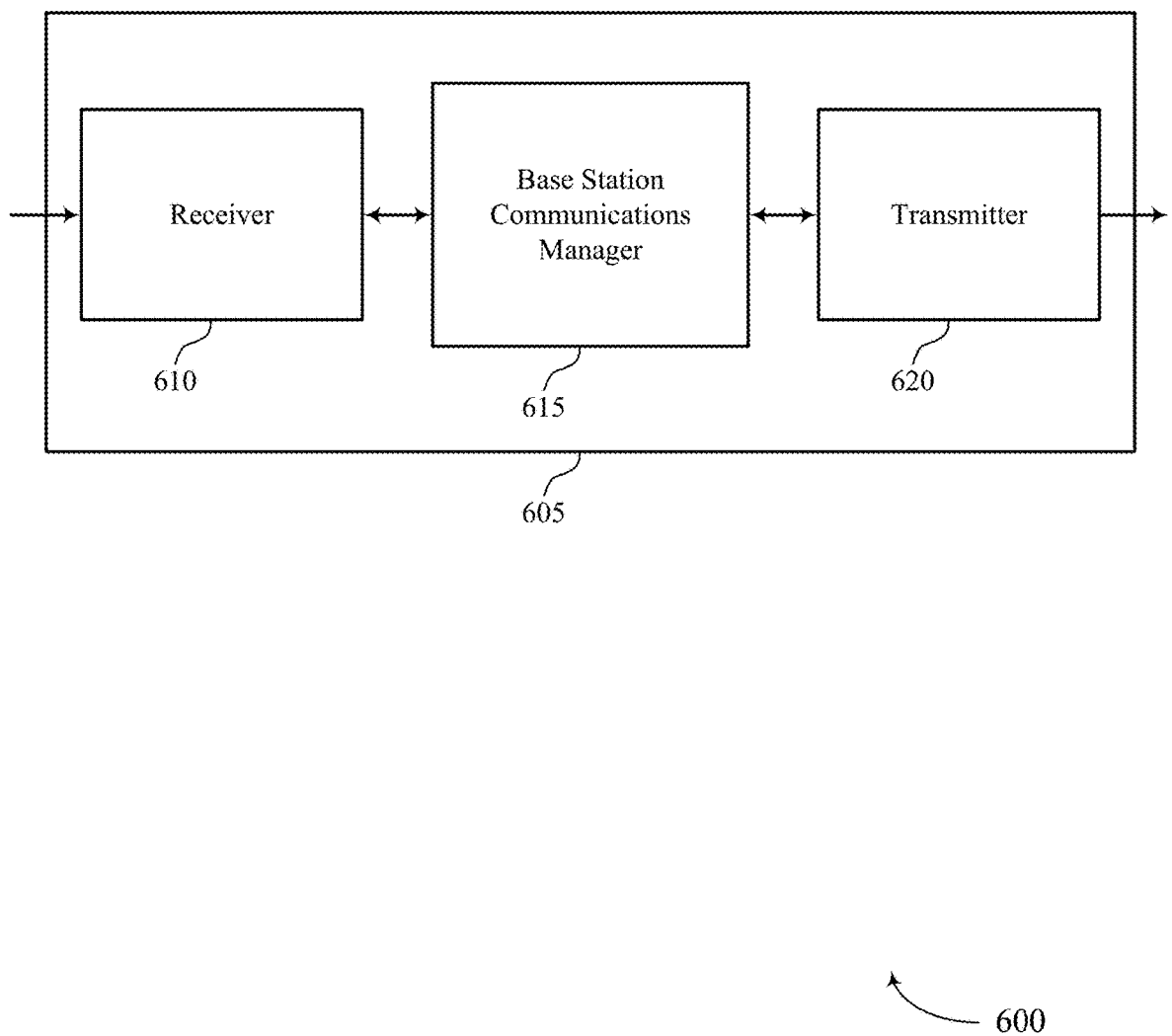
FIGS. 6 through 8 show block diagrams of a device that supports techniques for assisted beam refinement in accordance with aspects of the present disclosure.

FIG. 6 shows a block diagram 600 of a wireless device 605 that supports techniques for assisted beam refinement in accordance with aspects of the present disclosure. Wireless device 605 may be an example of aspects of a first communications device (e.g., base station 105) as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for assisted beam refinement, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may identify an establishment of one or more beam pair links between a base station and a second communications device such as a user equipment (UE) or another base station, where the one or more beam pair links are established using a beam management procedure, receive long-term feedback information from the second communications device after the one or more beam pair links are established using the beam management procedure, identify a subset of directional downlink beams to use in a device-specific short-term downlink beam refinement procedure implemented by the base station based on receiving the long-term feedback information from the second communications device, and perform the device-specific short-term downlink beam refinement procedure using the subset of directional downlink beams.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
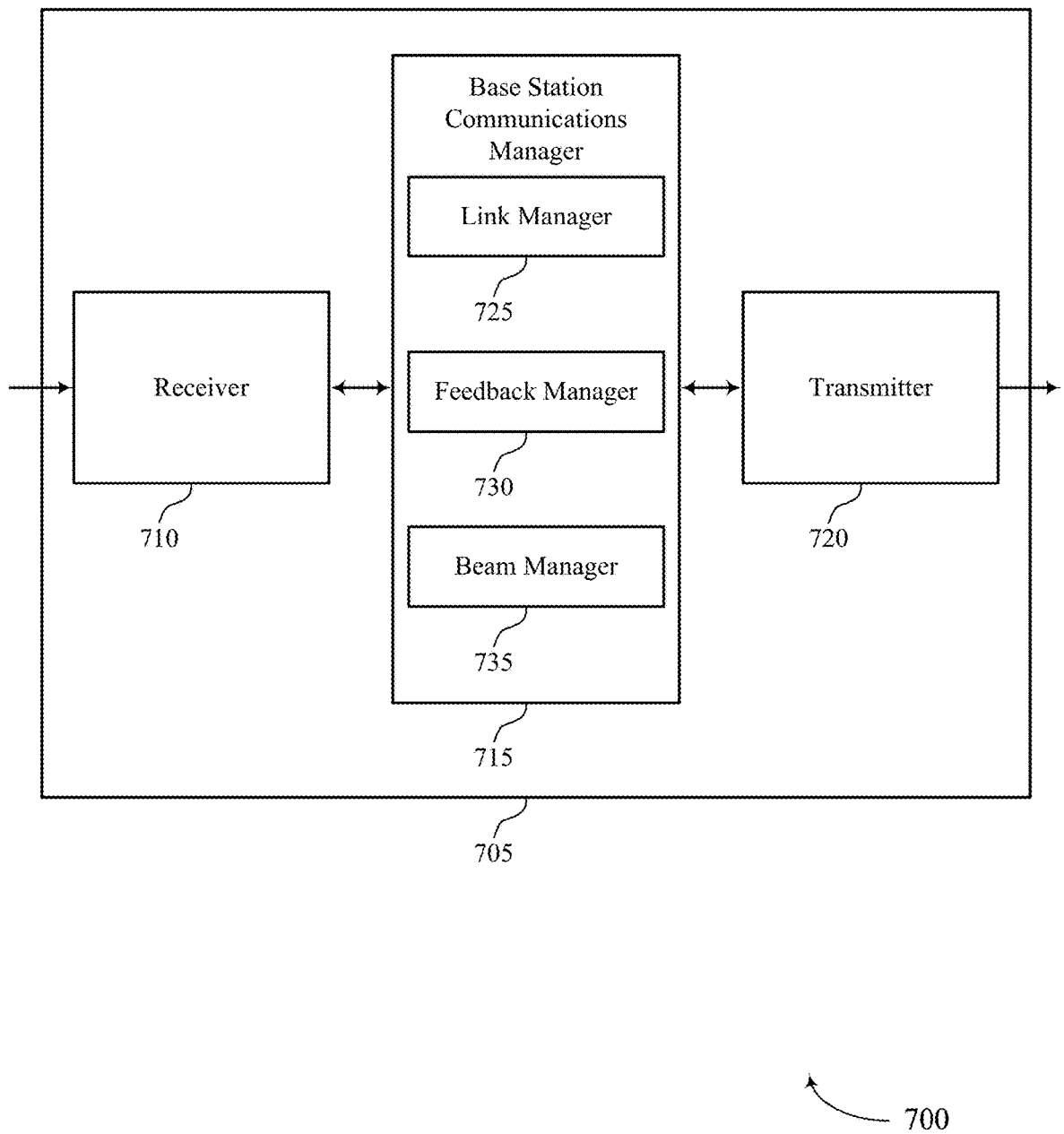

FIG. 7 shows a block diagram 700 of a wireless device 705 that supports techniques for assisted beam refinement in accordance with aspects of the present disclosure. Wireless device 705 may be an example of aspects of a wireless device 605 or a first communications device such as base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for assisted beam refinement, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may also include link manager 725, feedback manager 730, and beam manager 735.

Link manager 725 may identify an establishment of one or more beam pair links between a first communications device (e.g., base station, UE, or the like) and a second communications device (e.g., base station, UE, or the like), where the one or more beam pair links are established using a beam management procedure. In some cases, the beam management procedure includes a set of one or more L1/L2 procedures to acquire or maintain a set of one or more transmission reception points (TRxPs), communications device beams (e.g., UE beams), or a combination thereof. In some cases, the beam management procedure is a P-1/2/3 beam management procedure.

Feedback manager 730 may receive long-term feedback information from the second communications device after the one or more beam pair links are established using the beam management procedure. In some cases, the long-term feedback information includes information about a position of the second communications device (e.g., a UE) in a coverage area of the first communications device (e.g., a base station), the information being measured by one or more sensors of the second communications device. In some cases, the information includes global positioning system (GPS) data, accelerometer data, gyroscope data, or a combination thereof. In some cases, the long-term feedback information includes a set of uplink training symbols transmitted by the second communications device.

Beam manager 735 may identify a subset of directional downlink beams to use in a device-specific (e.g., UE-specific) short-term downlink beam refinement procedure implemented by the base station based on receiving the long-term feedback information from the second communications device and perform the device-specific short-term downlink beam refinement procedure using the subset of directional downlink beams.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
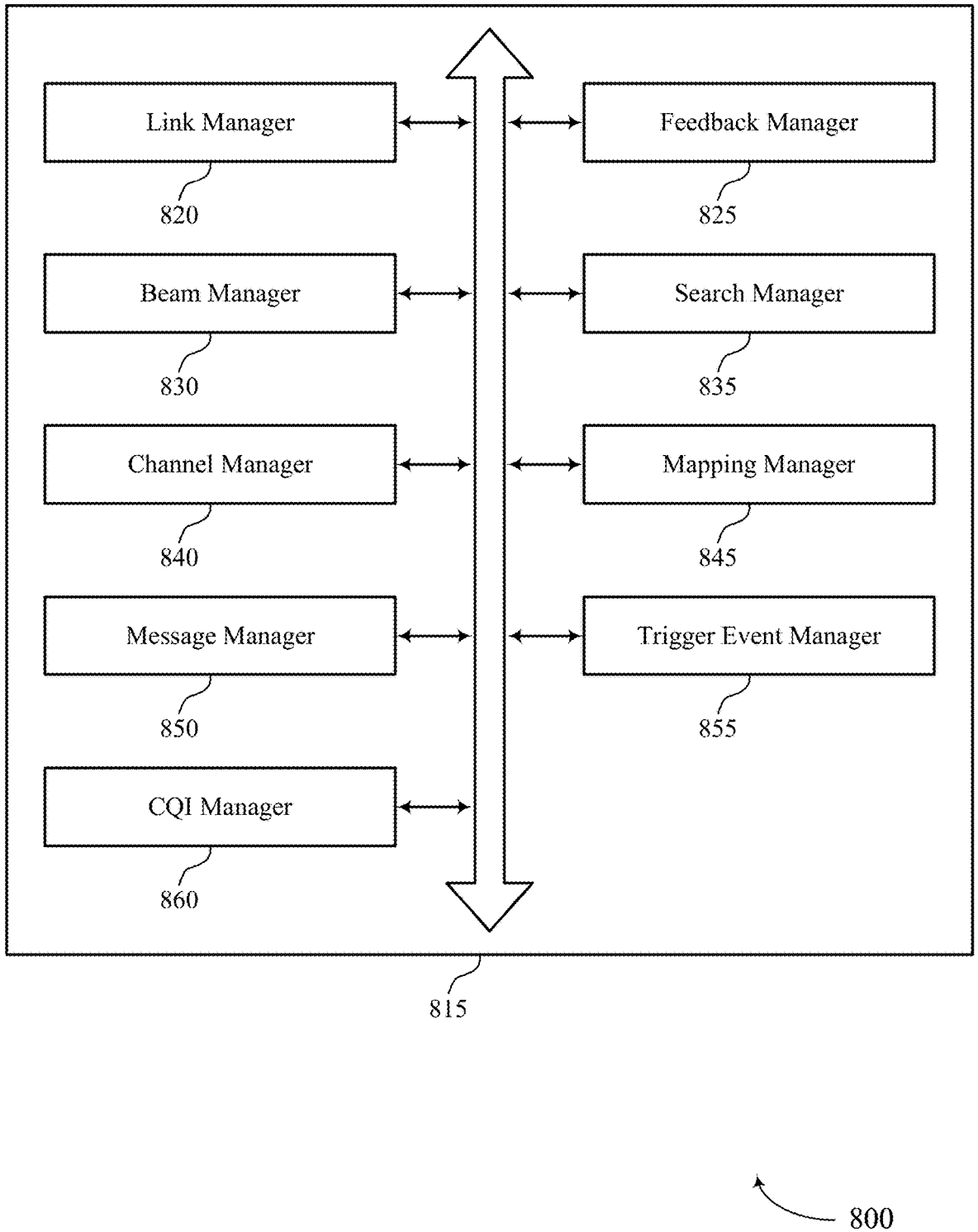

FIG. 8 shows a block diagram 800 of a base station communications manager 815 that supports techniques for assisted beam refinement in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include link manager 820, feedback manager 825, beam manager 830, search manager 835, channel manager 840, mapping manager 845, message manager 850, trigger event manager 855, and CQI manager 860. Each of these modules may communicate, directly or indirectly, with one another (e.g., via one or more buses).

Link manager 820 may identify an establishment of one or more beam pair links between a first communications device such as a base station and a second communications device such as a UE, where the one or more beam pair links are established using a beam management procedure. In some cases, the beam management procedure includes a set of one or more L1/L2 procedures to acquire or maintain a set of one or more transmission reception points (TRxPs), communications device beams (e.g., UE beams), or a combination thereof. In some cases, the beam management procedure is a P-1/2/3 beam management procedure.

Feedback manager 825 may receive long-term feedback information from the second communications device (e.g., a UE) after the one or more beam pair links are established using the beam management procedure. In some cases, the long-term feedback information includes information about a position of the second communications device in a coverage area of the base station, the information being measured by one or more sensors of the second communications device. In some cases, the information includes GPS data, accelerometer data, gyroscope data, or a combination thereof. In some cases, the long-term feedback information includes a set of uplink training symbols transmitted by the second communications device.

Beam manager 830 may identify a subset of directional downlink beams to use in a device-specific (e.g., UE-specific) short-term downlink beam refinement procedure implemented by the base station based on receiving the long-term feedback information from the second communications device and perform the device-specific short-term downlink beam refinement procedure using the subset of directional downlink beams.

Search manager 835 may localize a search for the device-specific short-term downlink beam refinement procedure based on receiving the long-term feedback information, where performing the device-specific short-term downlink beam refinement procedure is based on localizing the search.

Channel manager 840 may perform a long-term channel estimation based on receiving the set of uplink training symbols, where identifying the subset of directional downlink beams is based on performing the long-term channel estimation.

Mapping manager 845 may generate a long-term map of a channel environment of the base station using the long-term feedback information received from the second communications device, where the long-term map indicates historical conditions of the channel environment learned from the long-term feedback information received from the second communications device and other long-term feedback information received previously from a set of second communications devices such as a set of UEs and localize a search for the device-specific short-term downlink beam refinement procedure based on the long-term feedback information received from the second communications device and the long-term map of the channel environment. In some cases, the long-term map of the channel environment is a statistical covariance matrix configured to indicate historical fading conditions of a channel matrix.

Message manager 850 may transmit a message to the second communications device requesting the long-term feedback information, where receiving the long-term feedback information is based on transmitting the message.

Trigger event manager 855 may identify a trigger event for initiating the device-specific short-term downlink beam refinement procedure for the one or more beam pair links established using the beam management procedure, where identifying the subset of directional downlink beams is based on collecting long-term information after identifying the trigger event.

CQI manager 860 may receive, from the second communications device, CQI information or beam indices information about one or more directional beams of the one or more beam pair links, where identifying the trigger event is based on receiving the CQI information or the beam indices information and determine that a change in the CQI information or the beam indices information as compared to previous CQI information or previous beam indices information satisfies a predetermined criteria, where identifying the trigger event is based on determining that the change in the CQI information or the beam indices information satisfies the predetermined criteria. In some cases, the CQI information for a set of beam indices includes one or more of a reference signal receive power (RSRP), a reference signal received quality (RSRQ), a signal-to-noise ratio (SNR), or a signal-to-interference and noise ratio (SINR).

Figure 9:
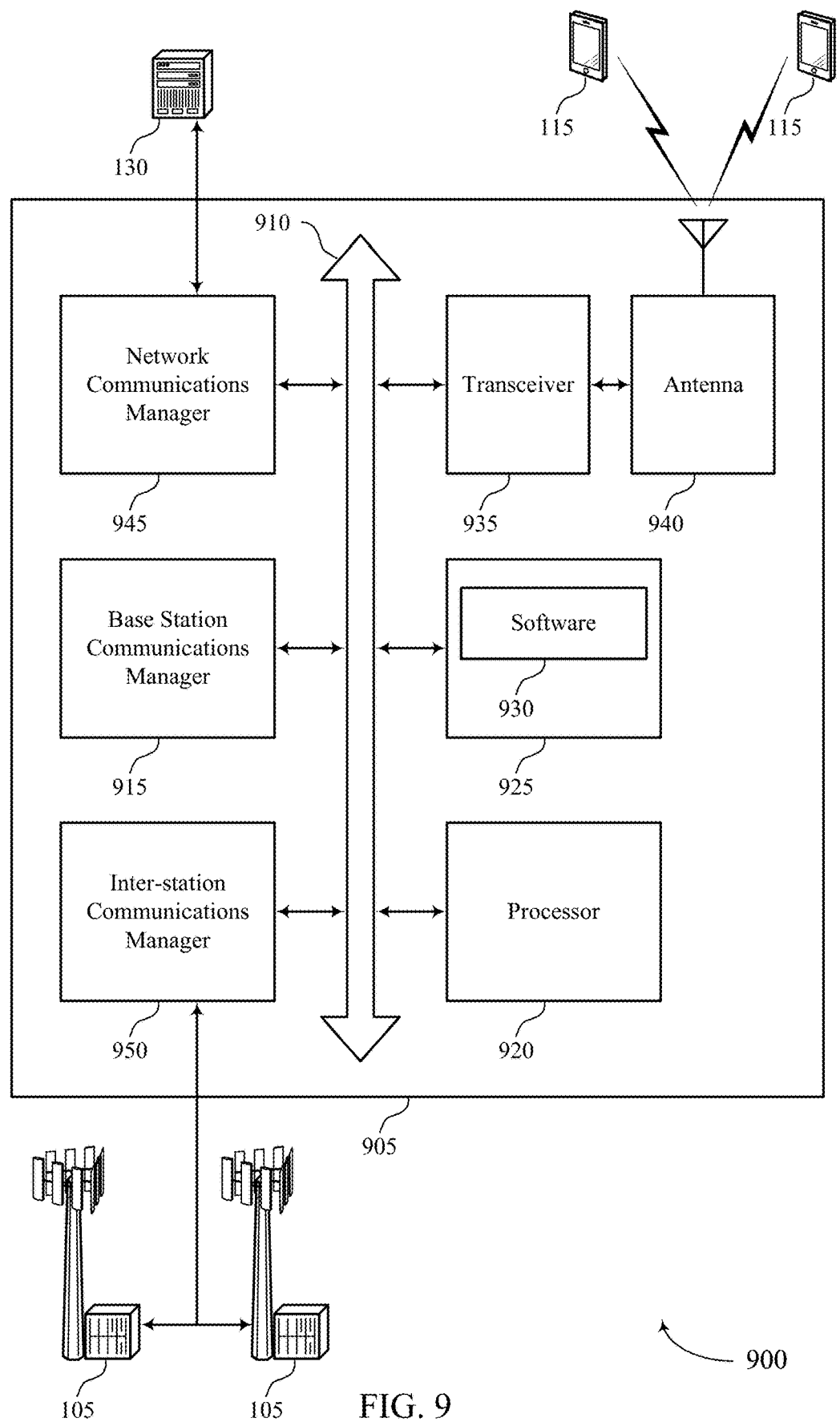
FIG. 9 illustrates a block diagram of a system including a base station that supports techniques for assisted beam refinement in accordance with aspects of the present disclosure.

FIG. 9 shows a diagram of a system 900 including a device 905 that supports techniques for assisted beam refinement in accordance with aspects of the present disclosure. Device 905 may be an example of or include the components of wireless device 605, wireless device 705, or a first communications device such as base station 105 as described herein, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for assisted beam refinement).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support techniques for assisted beam refinement. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with second communications device such as UEs 115 in cooperation with other first communications devices such as base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
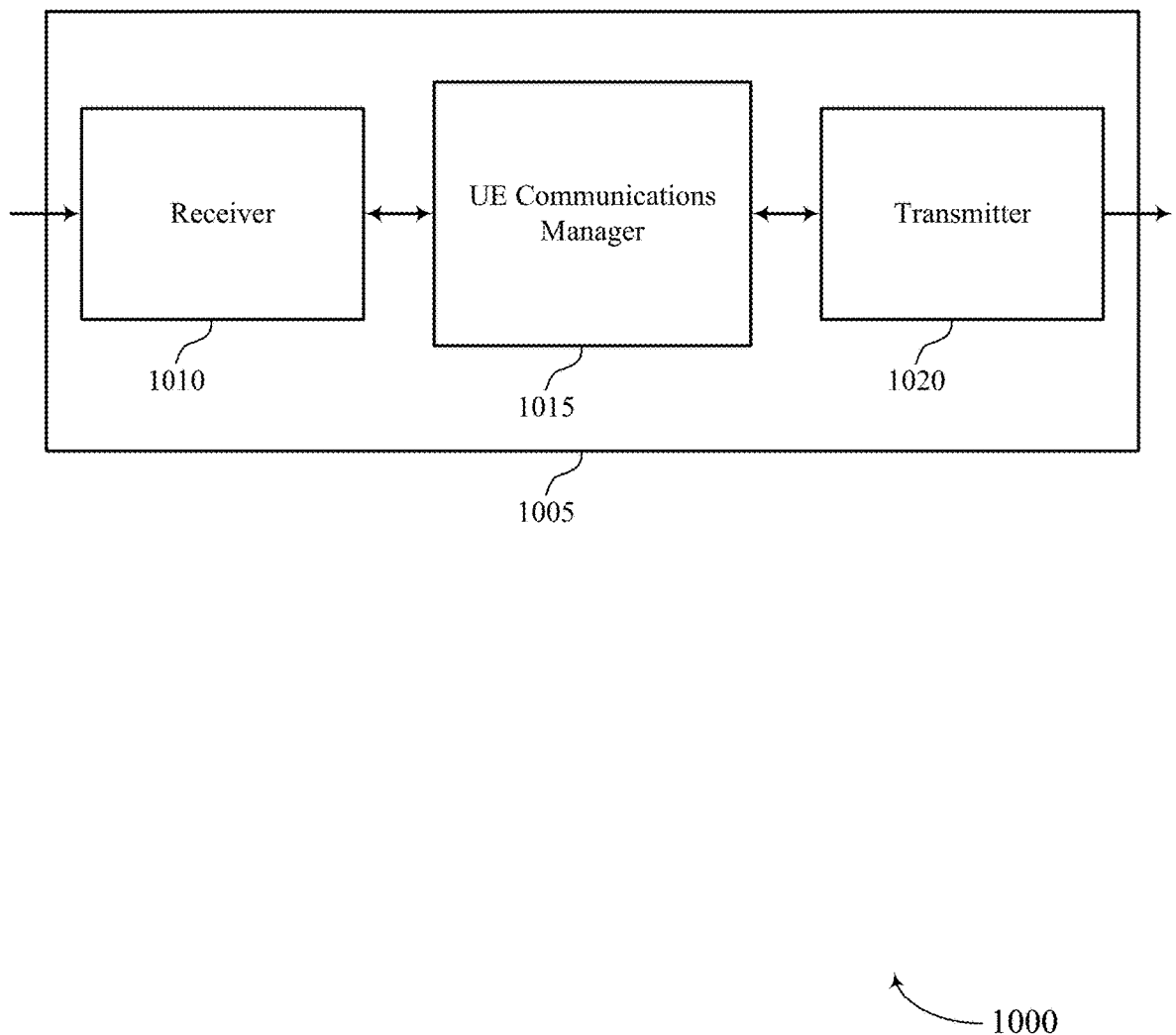
FIGS. 10 through 12 show block diagrams of a device that supports techniques for assisted beam refinement in accordance with aspects of the present disclosure.

FIG. 10 shows a block diagram 1000 of a wireless device 1005 that supports techniques for assisted beam refinement in accordance with aspects of the present disclosure. Wireless device 1005 may be an example of aspects of a second communications device (e.g., UE 115) as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for assisted beam refinement, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify an establishment of one or more beam pair links between a first communications device (e.g., base station) and a second communications device (e.g., a UE), where the one or more beam pair links are established using a beam management procedure, transmit long-term feedback information to the base station after the one or more beam pair links are established using the beam management procedure, receive instructions from the base station regarding a device-specific (e.g., UE-specific) short-term downlink beam refinement procedure based on transmitting the long-term feedback information, and perform the device-specific short-term downlink beam refinement procedure based on receiving the instructions.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
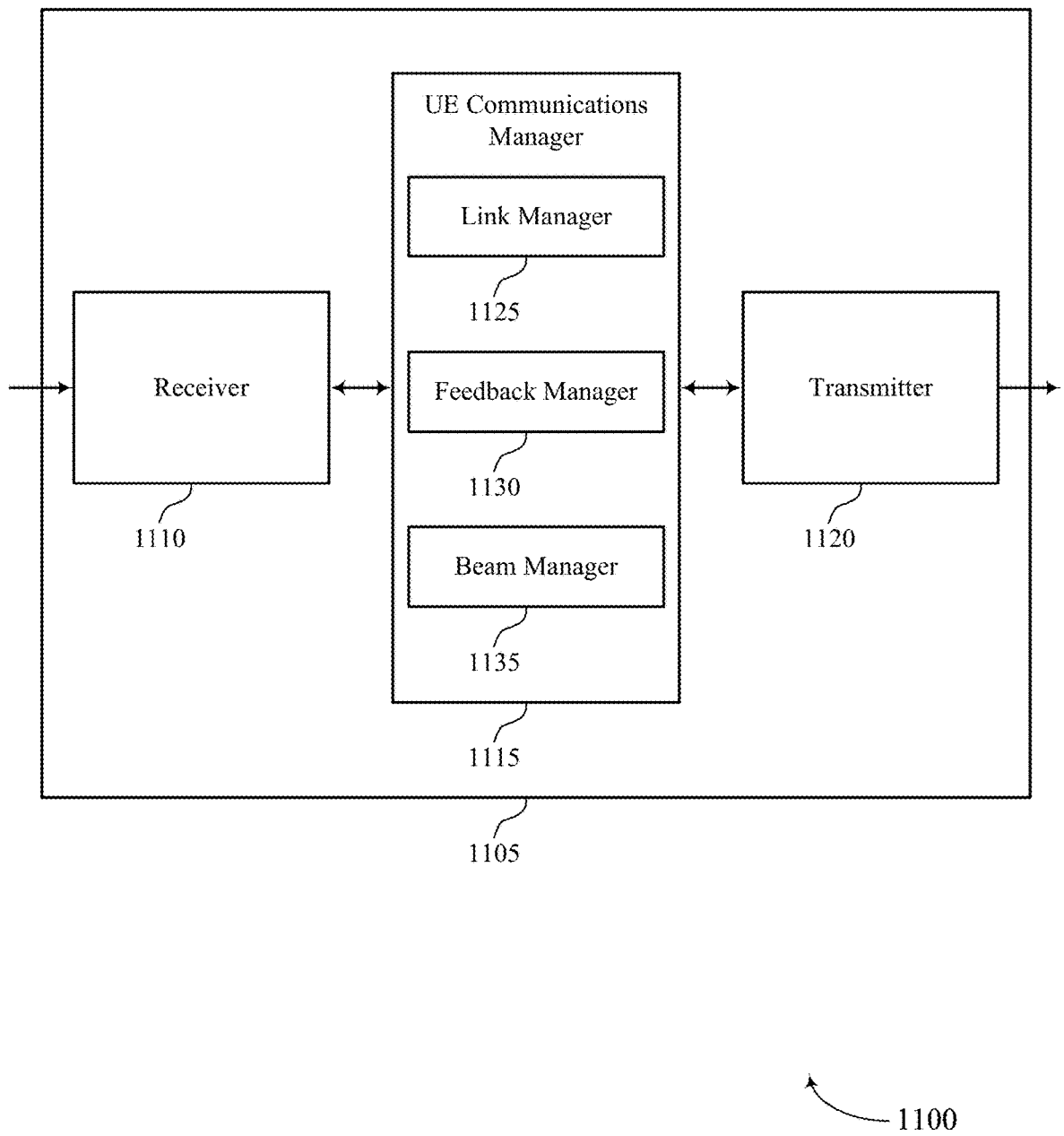

FIG. 11 shows a block diagram 1100 of a wireless device 1105 that supports techniques for assisted beam refinement in accordance with aspects of the present disclosure. Wireless device 1105 may be an example of aspects of a wireless device 1005 or a second communications device such as UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for assisted beam refinement, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include link manager 1125, feedback manager 1130, and beam manager 1135.

Link manager 1125 may identify an establishment of one or more beam pair links between a first communications device (e.g., a base station) and a second communications device (e.g., a UE), where the one or more beam pair links are established using a beam management procedure.

Feedback manager 1130 may transmit long-term feedback information to the base station after the one or more beam pair links are established using the beam management procedure.

Beam manager 1135 may receive instructions from the first communications device regarding a device-specific (e.g., UE-specific) short-term downlink beam refinement procedure based on transmitting the long-term feedback information and perform the device-specific short-term downlink beam refinement procedure based on receiving the instructions. In some cases, the beam management procedure includes a set of one or more L1/L2 procedures to acquire or maintain a set of one or more transmission reception points (TRxPs), communications device beams (e.g., UE beams), or a combination thereof. In some cases, the beam management procedure is a P-1/2/3 beam management procedure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
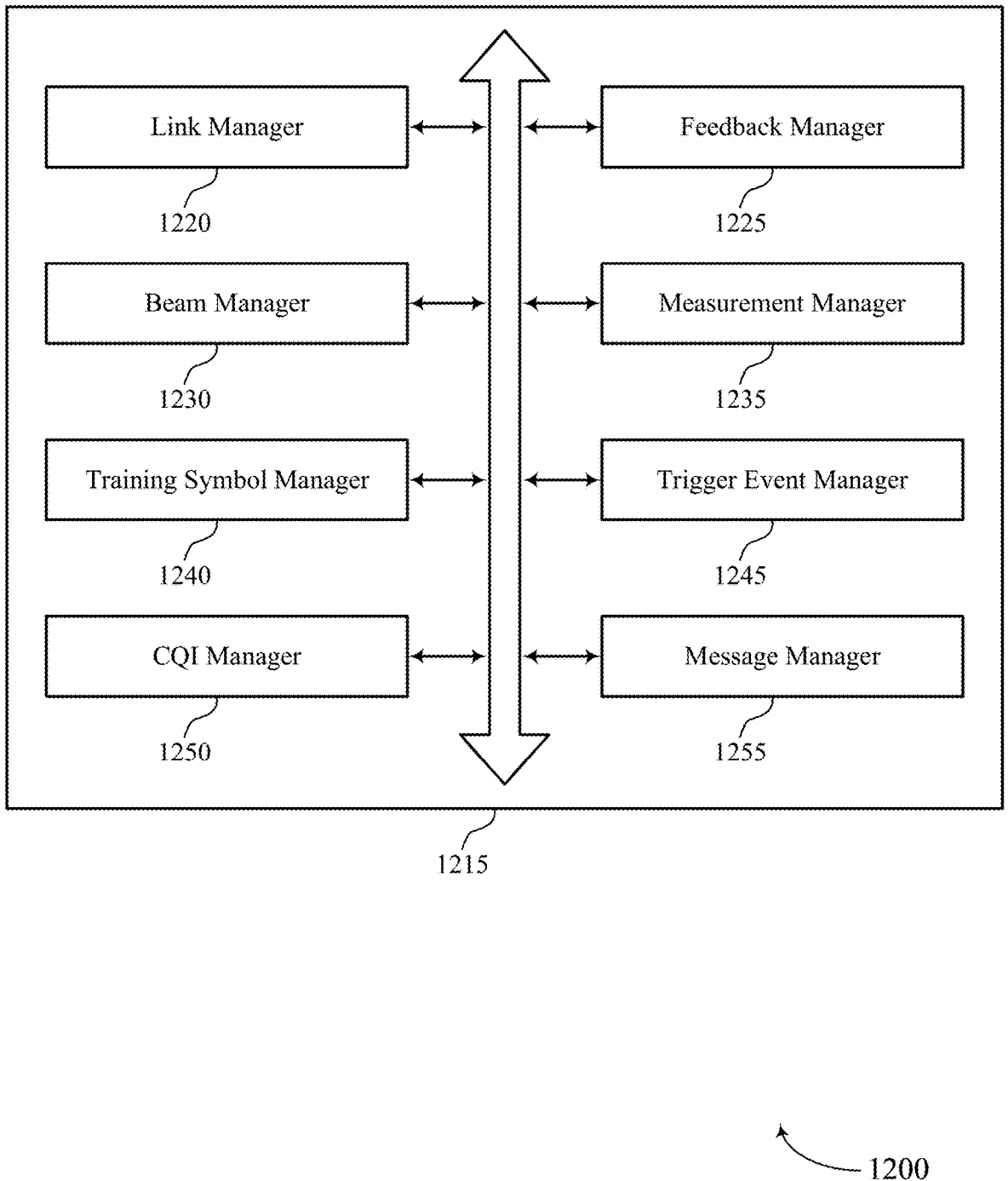

FIG. 12 shows a block diagram 1200 of a UE communications manager 1215 that supports techniques for assisted beam refinement in accordance with aspects of the present disclosure. The UE communications manager 1215 may be an example of aspects of a UE communications manager 1315 described with reference to FIGS. 10, 11, and 13. The UE communications manager 1215 may include link manager 1220, feedback manager 1225, beam manager 1230, measurement manager 1235, training symbol manager 1240, trigger event manager 1245, CQI manager 1250, and message manager 1255. Each of these modules may communicate, directly or indirectly, with one another (e.g., via one or more buses).

Link manager 1220 may identify an establishment of one or more beam pair links between a first communications device such as a base station and a second communications device such as a UE, where the one or more beam pair links are established using a beam management procedure.

Feedback manager 1225 may transmit long-term feedback information to the second communications device after the one or more beam pair links are established using the beam management procedure.

Beam manager 1230 may receive instructions from the second communications device regarding a device-specific (e.g., a UE-specific) short-term downlink beam refinement procedure based on transmitting the long-term feedback information and perform the device-specific short-term downlink beam refinement procedure based on receiving the instructions. In some cases, the beam management procedure includes a set of one or more L1/L2 procedures to acquire or maintain a set of one or more transmission reception points (TRxPs), communications device beams (e.g., UE beams), or a combination thereof. In some cases, the beam management procedure is a P-1/2/3 beam management procedure.

Measurement manager 1235 may measure a position of the second communications device (e.g., a UE) in a coverage area of the first communications device (e.g., a base station) using one or more sensors, where the long-term feedback information includes information about the position of the second communications device. In some cases, the information includes GPS data, accelerometer data, gyroscope data, or a combination thereof.

Training symbol manager 1240 may transmit a set of uplink training symbols to the second communications device, the set of uplink training symbols configured to provide the first communications device with channel estimation data, where the long-term feedback information includes the set of uplink training symbols.

Trigger event manager 1245 may identify a trigger event for initiating the device-specific (e.g., UE-specific) short-term downlink beam refinement procedure after the one or more beam pair links are established using the beam management procedure, where transmitting the long-term feedback information is based on identifying the trigger event.

CQI manager 1250 may transmit, to the first communications device, CQI information about one or more directional beams of the one or more beam pair links and determine that a change in the CQI information as compared to previous CQI information satisfies a predetermined criteria, where identifying the trigger event is based on determining that the change in the CQI information satisfies the predetermined criteria. In some cases, the CQI information for a set of beam indices includes one or more of a reference signal receive power (RSRP), a reference signal received quality (RSRQ), a SNR, or a signal-to-interference and noise ratio (SINR).

Message manager 1255 may receive a message to the second communications device requesting the long-term feedback information, where transmitting the long-term feedback information is based on receiving the message.

Figure 13:
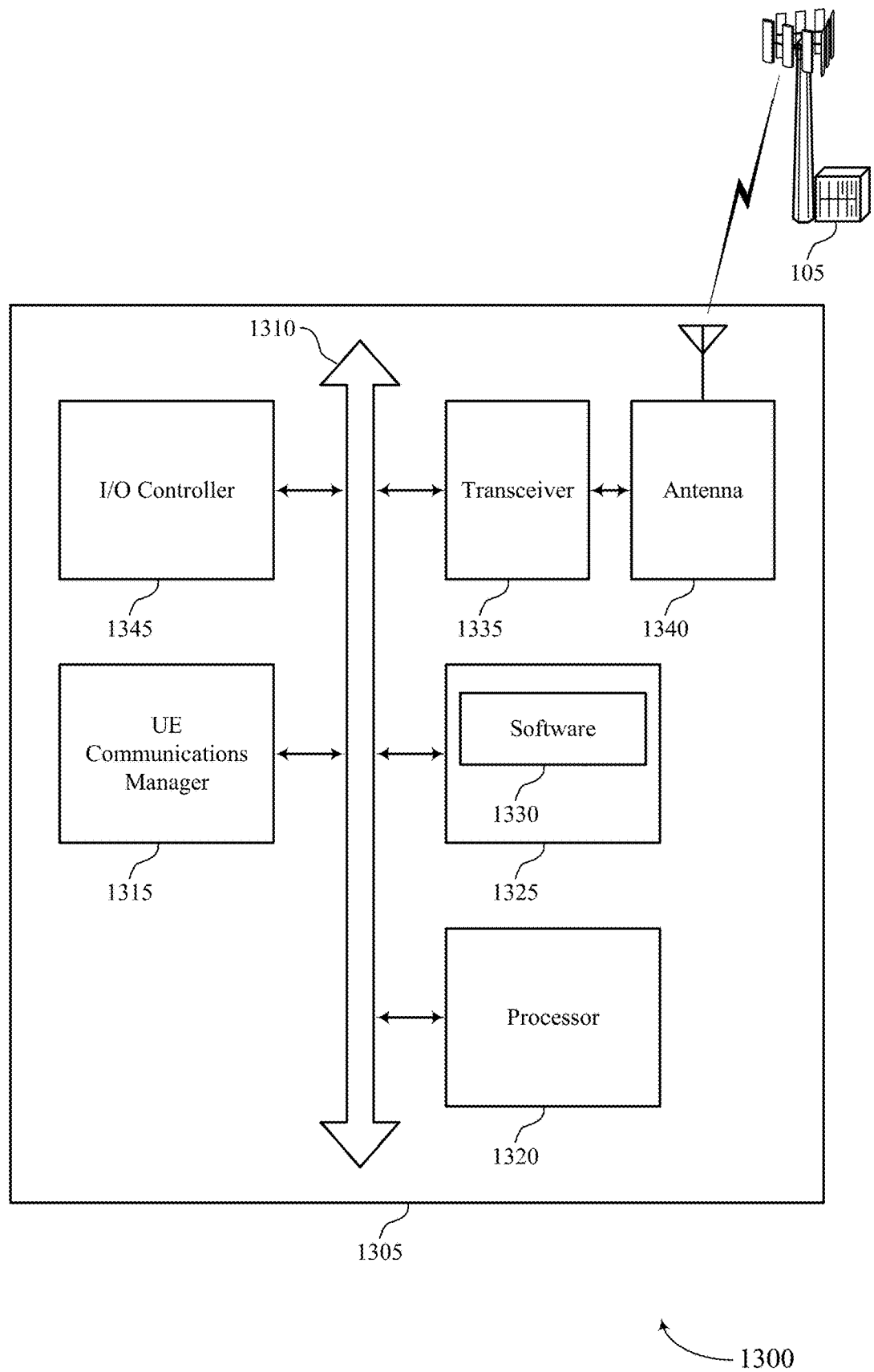
FIG. 13 illustrates a block diagram of a system including a UE that supports techniques for assisted beam refinement in accordance with aspects of the present disclosure.

FIG. 13 shows a diagram of a system 1300 including a device 1305 that supports techniques for assisted beam refinement in accordance with aspects of the present disclosure. Device 1305 may be an example of or include the components of the second communications device such as UE 115 as described herein, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting techniques for assisted beam refinement).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support techniques for assisted beam refinement. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
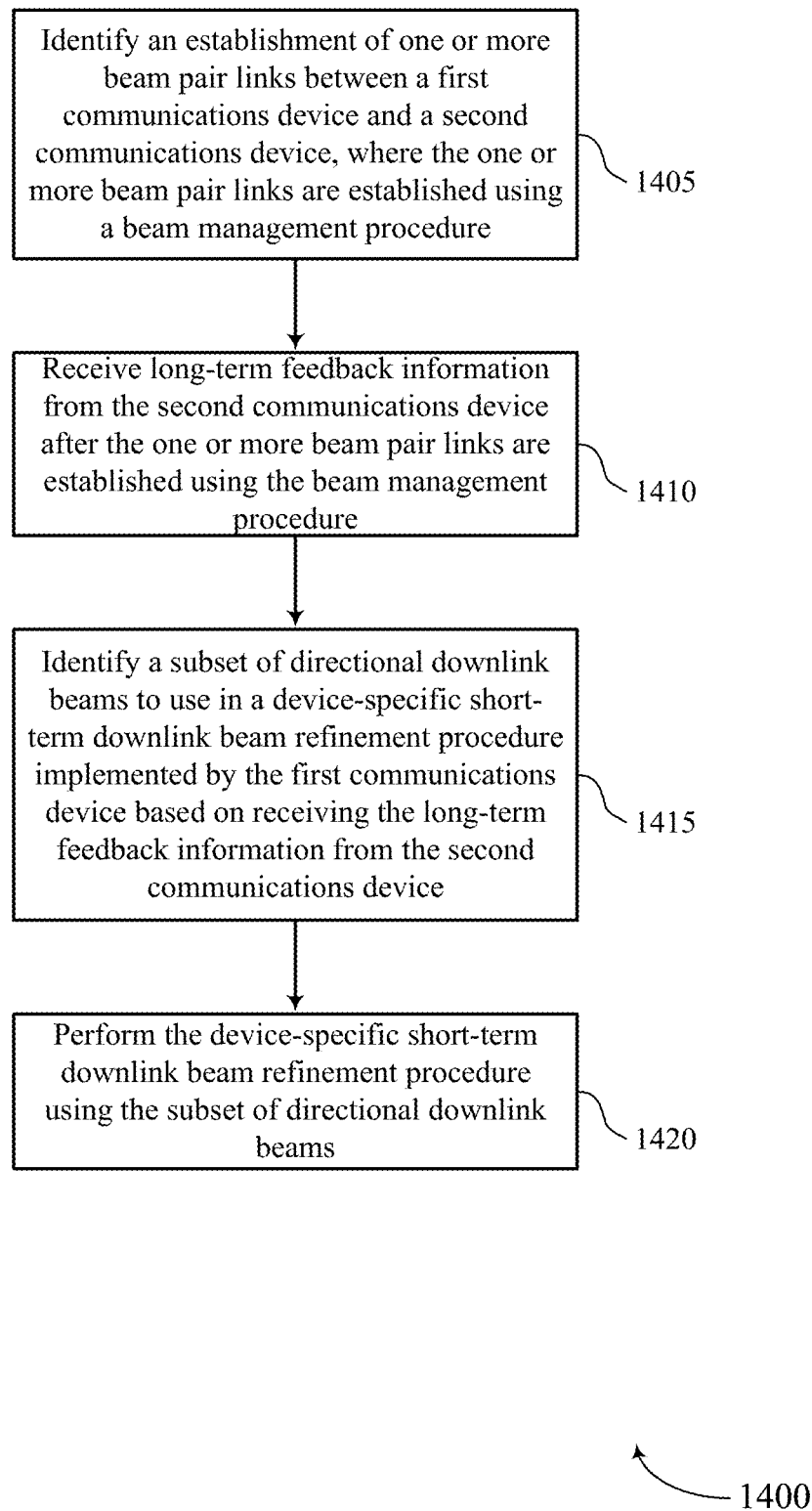
FIGS. 14 through 17 illustrate methods for techniques for assisted beam refinement in accordance with aspects of the present disclosure.

FIG. 14 shows a flowchart illustrating a method 1400 for techniques for assisted beam refinement in accordance with aspects of the present disclosure. The operations of method 1400 may be implemented by a first communications device (e.g., base station 105) or its components as described herein. For example, the operations of method 1400 may be performed by a base station communications manager as described with reference to FIGS. 6 through 9. In some examples, a base station 105 may execute a set of codes to control the functional elements of the device to perform the functions described herein. Additionally or alternatively, the base station 105 may perform aspects of the functions described herein using special-purpose hardware.

At 1405 the first communications device (e.g., base station 105) may identify an establishment of one or more beam pair links between a first communications device such as a base station and a second communications device such as a user equipment (UE), wherein the one or more beam pair links are established using a beam management procedure. The operations of 1405 may be performed according to the methods described herein. In certain examples, aspects of the operations of 1405 may be performed by a link manager as described with reference to FIGS. 6 through 9.

At 1410 the base station 105 may receive long-term feedback information from the second communications device after the one or more beam pair links are established using the beam management procedure. The operations of 1410 may be performed according to the methods described herein. In certain examples, aspects of the operations of 1410 may be performed by a feedback manager as described with reference to FIGS. 6 through 9.

At 1415 the first communications device (e.g., base station 105) may identify a subset of directional downlink beams to use in a device-specific (e.g., a UE-specific) short-term downlink beam refinement procedure implemented by the first communications device based at least in part on receiving the long-term feedback information from the second communications device. The operations of 1415 may be performed according to the methods described herein. In certain examples, aspects of the operations of 1415 may be performed by a beam manager as described with reference to FIGS. 6 through 9.

At 1420 the first communications device (e.g., base station 105) may perform the device-specific short-term downlink beam refinement procedure using the subset of directional downlink beams. The operations of 1420 may be performed according to the methods described herein. In certain examples, aspects of the operations of 1420 may be performed by a beam manager as described with reference to FIGS. 6 through 9.

Figure 15:
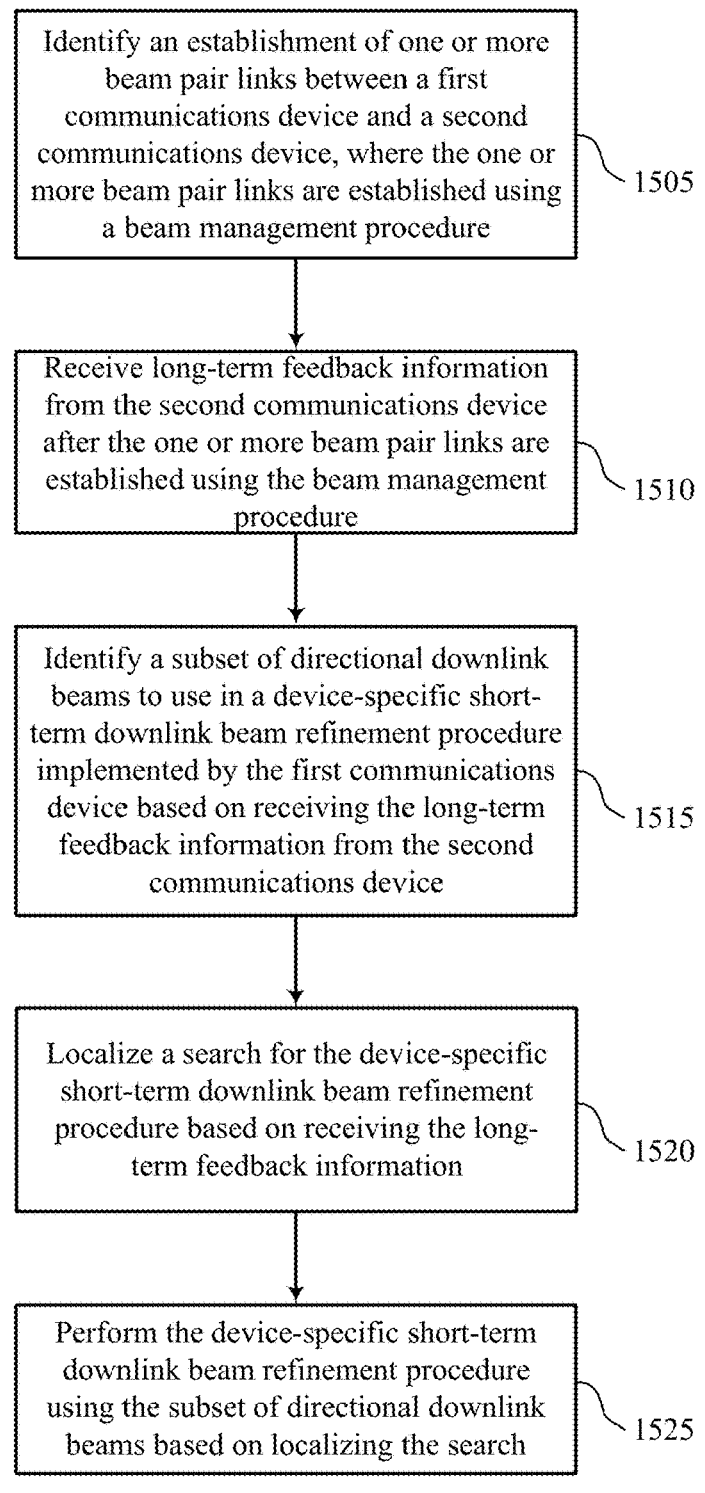

FIG. 15 shows a flowchart illustrating a method 1500 for techniques for assisted beam refinement in accordance with aspects of the present disclosure. The operations of method 1500 may be implemented by a first communications device (e.g., base station 105) or its components as described herein. For example, the operations of method 1500 may be performed by a base station communications manager as described with reference to FIGS. 6 through 9. In some examples, a first communications device may execute a set of codes to control the functional elements of the device to perform the functions described herein. Additionally or alternatively, the first communications device may perform aspects of the functions described herein using special-purpose hardware.

At 1505 the base station 105 may identify an establishment of one or more beam pair links between a first communications device such as a base station and a second communications device such as a user equipment (UE), wherein the one or more beam pair links are established using a beam management procedure. The operations of 1505 may be performed according to the methods described herein. In certain examples, aspects of the operations of 1505 may be performed by a link manager as described with reference to FIGS. 6 through 9.

At 1510 the base station 105 may receive long-term feedback information from the second communications device after the one or more beam pair links are established using the beam management procedure. The operations of 1510 may be performed according to the methods described herein. In certain examples, aspects of the operations of 1510 may be performed by a feedback manager as described with reference to FIGS. 6 through 9.

At 1515 the base station 105 may identify a subset of directional downlink beams to use in a device-specific (e.g., a UE-specific) short-term downlink beam refinement procedure implemented by the base station based at least in part on receiving the long-term feedback information from the second communications device. The operations of 1515 may be performed according to the methods described herein. In certain examples, aspects of the operations of 1515 may be performed by a beam manager as described with reference to FIGS. 6 through 9.

At 1520 the base station 105 may localize a search for the device-specific short-term downlink beam refinement procedure based at least in part on receiving the long-term feedback information. The operations of 1520 may be performed according to the methods described herein. In certain examples, aspects of the operations of 1520 may be performed by a search manager as described with reference to FIGS. 6 through 9.

At 1525 the base station 105 may perform the device-specific short-term downlink beam refinement procedure using the subset of directional downlink beams based at least in part on localizing the search. The operations of 1525 may be performed according to the methods described herein. In certain examples, aspects of the operations of 1525 may be performed by a beam manager as described with reference to FIGS. 6 through 9.

Figure 16:
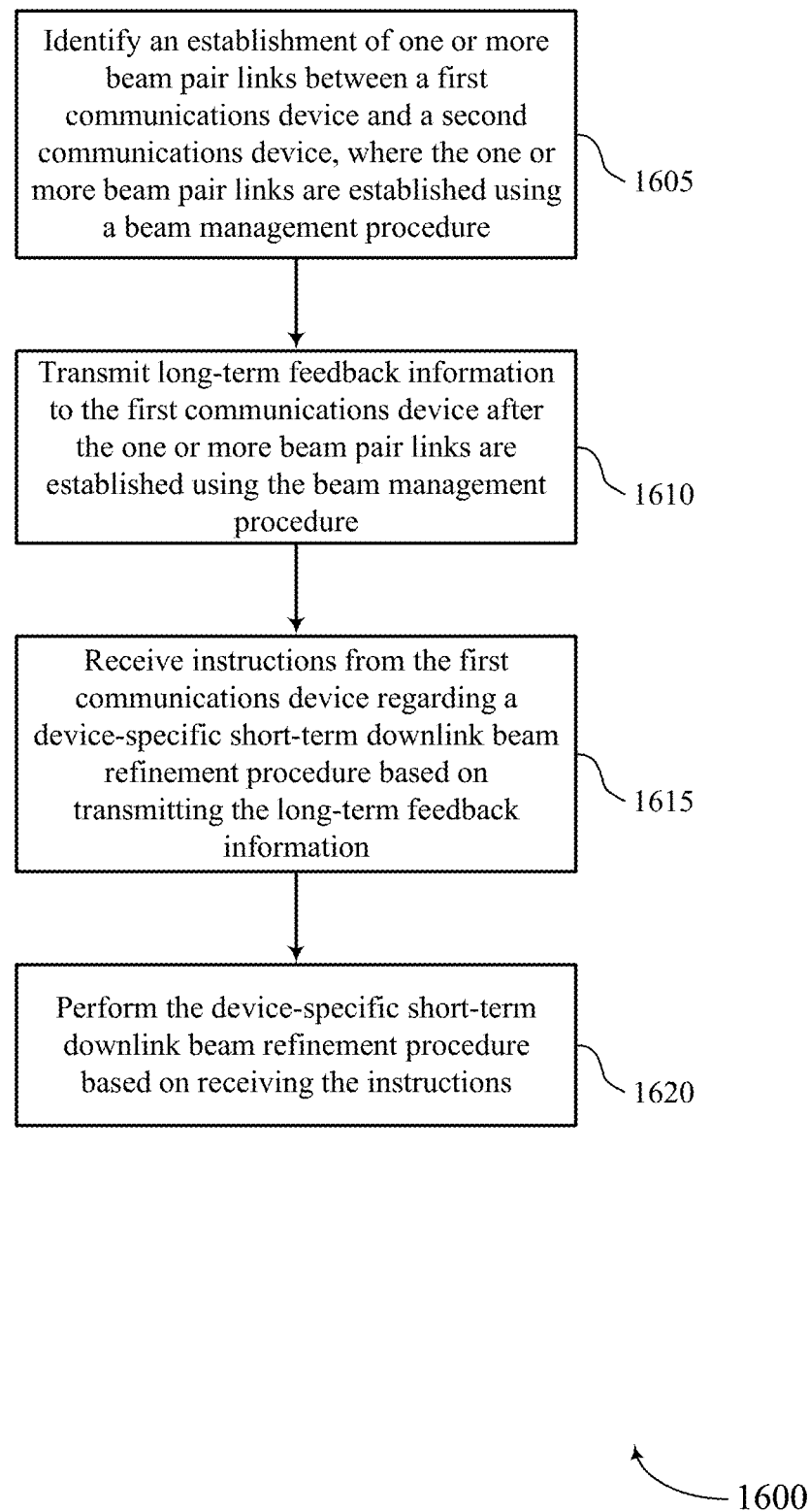

FIG. 16 shows a flowchart illustrating a method 1600 for techniques for assisted beam refinement in accordance with aspects of the present disclosure. The operations of method 1600 may be implemented by a second communications device (e.g., UE 115) or its components as described herein. For example, the operations of method 1600 may be performed by a UE communications manager as described with reference to FIGS. 10 through 13. In some examples, a second communications device may execute a set of codes to control the functional elements of the device to perform the functions described herein. Additionally or alternatively, the second communications device may perform aspects of the functions described herein using special-purpose hardware.

At 1605 the UE 115 may identify an establishment of one or more beam pair links between a first communications device such as a base station and a second communications device such as user equipment (UE), wherein the one or more beam pair links are established using a beam management procedure. The operations of 1605 may be performed according to the methods described herein. In certain examples, aspects of the operations of 1605 may be performed by a link manager as described with reference to FIGS. 10 through 13.

At 1610 the UE 115 may transmit long-term feedback information to the first communications device after the one or more beam pair links are established using the beam management procedure. The operations of 1610 may be performed according to the methods described herein. In certain examples, aspects of the operations of 1610 may be performed by a feedback manager as described with reference to FIGS. 10 through 13.

At 1615 the UE 115 may receive instructions from the base station regarding a device-specific (e.g., a UE-specific) short-term downlink beam refinement procedure based at least in part on transmitting the long-term feedback information. The operations of 1615 may be performed according to the methods described herein. In certain examples, aspects of the operations of 1615 may be performed by a beam manager as described with reference to FIGS. 10 through 13.

At 1620 the UE 115 may perform the device-specific short-term downlink beam refinement procedure based at least in part on receiving the instructions. The operations of 1620 may be performed according to the methods described herein. In certain examples, aspects of the operations of 1620 may be performed by a beam manager as described with reference to FIGS. 10 through 13.

Figure 17:
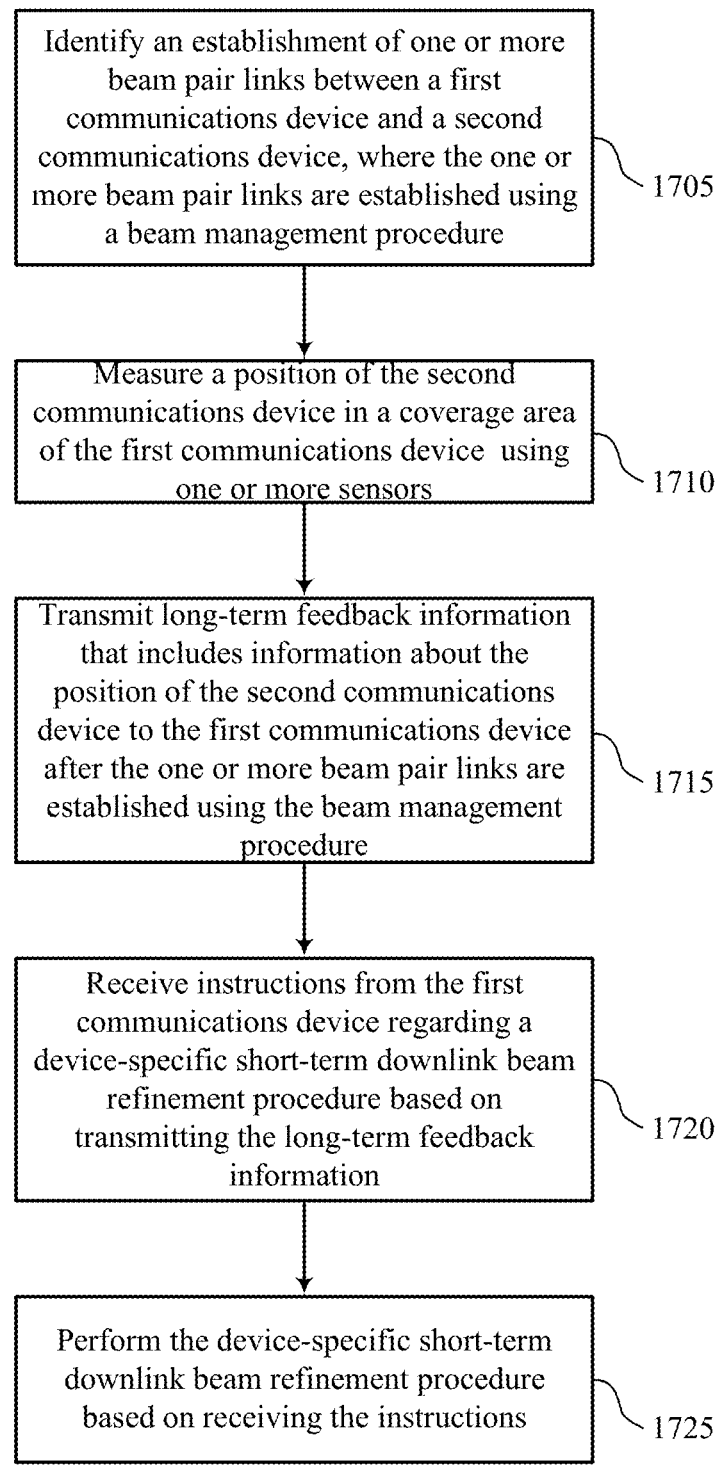

FIG. 17 shows a flowchart illustrating a method 1700 for techniques for assisted beam refinement in accordance with aspects of the present disclosure. The operations of method 1700 may be implemented by a second communications device (e.g., UE 115) or its components as described herein. For example, the operations of method 1700 may be performed by a UE communications manager as described with reference to FIGS. 10 through 13. In some examples, a second communications device may execute a set of codes to control the functional elements of the device to perform the functions described herein. Additionally or alternatively, the second communications device may perform aspects of the functions described herein using special-purpose hardware.

At 1705 the UE 115 may identify an establishment of one or more beam pair links between a first communications device such as a base station and a second communications device such as a user equipment (UE), wherein the one or more beam pair links are established using a beam management procedure. The operations of 1705 may be performed according to the methods described herein. In certain examples, aspects of the operations of 1705 may be performed by a link manager as described with reference to FIGS. 10 through 13.

At 1710 the UE 115 may measure a position of the second communications device in a coverage area of the first communications device using one or more sensors. The operations of 1710 may be performed according to the methods described herein. In certain examples, aspects of the operations of 1710 may be performed by a measurement manager as described with reference to FIGS. 10 through 13.

At 1715 the UE 115 may transmit long-term feedback information includes information about the position of the second communications device to the first communications device after the one or more beam pair links are established using the beam management procedure. The operations of 1715 may be performed according to the methods described herein. In certain examples, aspects of the operations of 1715 may be performed by a feedback manager as described with reference to FIGS. 10 through 13.

At 1720 the UE 115 may receive instructions from the second communications device regarding a device-specific (e.g., a UE-specific) short-term downlink beam refinement procedure based at least in part on transmitting the long-term feedback information. The operations of 1720 may be performed according to the methods described herein. In certain examples, aspects of the operations of 1720 may be performed by a beam manager as described with reference to FIGS. 10 through 13.

At 1725 the UE 115 may perform the device-specific short-term downlink beam refinement procedure based at least in part on receiving the instructions. The operations of 1725 may be performed according to the methods described herein. In certain examples, aspects of the operations of 1725 may be performed by a beam manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying one or more beam pair links between a first communications device and a second communications device, wherein the one or more beam pair links are established using a beam management procedure;
receiving long-term feedback information from the second communications device after the one or more beam pair links are established using the beam management procedure;
identifying a subset of directional downlink beams to use in a device-specific short-term downlink beam refinement procedure implemented by the first communications device based at least in part on receiving the long-term feedback information from the second communications device; and
performing the device-specific short-term downlink beam refinement procedure using the subset of directional downlink beams.

2. The method of claim 1, further comprising:
localizing a search for the device-specific short-term downlink beam refinement procedure based at least in part on receiving the long-term feedback information, wherein performing the device-specific short-term downlink beam refinement procedure is based at least in part on localizing the search.

3. The method of claim 1, wherein the long-term feedback information includes information about a position of the second communications device in a coverage area of the first communications device, the information being measured by one or more sensors of the second communications device.

4. The method of claim 3, wherein the information includes one or more of global positioning system (GPS) data, accelerometer data, or gyroscope data.

5. The method of claim 1, wherein the long-term feedback information includes a plurality of uplink training symbols transmitted by the second communications device.

6. The method of claim 5, further comprising:
performing a long-term channel estimation based at least in part on receiving the plurality of uplink training symbols, wherein identifying the subset of directional downlink beams is based at least in part on performing the long-term channel estimation.

7. The method of claim 1, wherein the beam management procedure includes a set of one or more L1/L2 procedures to acquire or maintain a set of one or more transmission reception points (TRxPs), or communications device beams.

8. The method of claim 1, wherein the beam management procedure is a P-1/2/3 beam management procedure.

9. The method of claim 1, further comprising:
generating a long-term map of a channel environment of the first communications device using the long-term feedback information received from the second communications device, wherein the long-term map indicates historical conditions of the channel environment learned from the long-term feedback information received from the second communications device and other long-term feedback information received previously from a plurality of second communications devices.

10. The method of claim 9, further comprising:
localizing a search for the device-specific short-term downlink beam refinement procedure based at least in part on the long-term feedback information received from the second communications device and the long-term map of the channel environment.

11. The method of claim 9, wherein the long-term map of the channel environment is a statistical covariance matrix configured to indicate historical fading conditions of a channel matrix.

12. The method of claim 1, further comprising:
transmitting a message to the second communications device requesting the long-term feedback information, wherein receiving the long-term feedback information is based at least in part on transmitting the message.

13. The method of claim 1, further comprising:
identifying a trigger event for initiating the device-specific short-term downlink beam refinement procedure for the one or more beam pair links established using the beam management procedure, wherein identifying the subset of directional downlink beams is based at least in part on collecting long-term information after identifying the trigger event.

14. The method of claim 13, further comprising:
receiving, from the second communications device, channel quality indicator (CQI) information or beam indices information about one or more directional beams of the one or more beam pair links, wherein identifying the trigger event is based at least in part on receiving the CQI information or the beam indices information.

15. The method of claim 14, further comprising:
determining that a change in the CQI information or the beam indices information as compared to previous CQI information or previous beam indices information satisfies a predetermined criteria, wherein identifying the trigger event is based at least in part on determining that the change in the CQI information or the beam indices information satisfies the predetermined criteria.

16. The method of claim 14, wherein the CQI information for a plurality of beam indices includes one or more of a reference signal receive power (RSRP), a reference signal received quality (RSRQ), a signal-to-noise ratio (SNR), or a signal-to-interference and noise ratio (SINR).

17. A method for wireless communication, comprising:
identifying of one or more beam pair links between a first communications device and a second communications device, wherein the one or more beam pair links are established using a beam management procedure;
transmitting long-term feedback information to the first communications device after the one or more beam pair links are established using the beam management procedure;
receiving instructions from the first communications device regarding a device-specific short-term downlink beam refinement procedure based at least in part on transmitting the long-term feedback information; and performing the device-specific short-term downlink beam refinement procedure based at least in part on receiving the instructions.

18. The method of claim 17, further comprising:
measuring a position of the second communications device in a coverage area of the first communications device using one or more sensors, wherein the long-term feedback information includes information about the position of the second communications device.

19. The method of claim 18, wherein the information includes one or more of global positioning system (GPS) data, accelerometer data, or gyroscope data.

20. The method of claim 17, further comprising:
transmitting a plurality of uplink training symbols to the first communications device, the plurality of uplink training symbols configured to provide the first communications device with channel estimation data, wherein the long-term feedback information includes the plurality of uplink training symbols.

21. The method of claim 17, wherein the beam management procedure includes a set of one or more L1/L2 procedures to acquire or maintain a set of one or more transmission reception points (TRxPs), or communications device beams.

22. The method of claim 17, wherein the beam management procedure is a P-1/2/3 beam management procedure.

23. The method of claim 17, further comprising:
identifying a trigger event for initiating the device-specific short-term downlink beam refinement procedure after the one or more beam pair links are established using the beam management procedure, wherein transmitting the long-term feedback information is based at least in part on identifying the trigger event.

24. The method of claim 23, further comprising:
transmitting, to the first communications device, channel quality indicator (CQI) information about one or more directional beams of the one or more beam pair links.

25. The method of claim 24, further comprising:
determining that a change in the CQI information as compared to previous CQI information satisfies a predetermined criteria, wherein identifying the trigger event is based at least in part on determining that the change in the CQI information satisfies the predetermined criteria.

26. The method of claim 24, wherein the CQI information for a plurality of beam indices includes one or more of a reference signal receive power (RSRP), a reference signal received quality (RSRQ), a signal-to-noise ratio (SNR), or a signal-to-interference and noise ratio (SINR).

27. The method of claim 17, further comprising:
receiving a message at the second communications device requesting the long-term feedback information, wherein transmitting the long-term feedback information is based at least in part on receiving the message.

28. An apparatus for wireless communication, comprising:
a processor;
memory in electronic communication with the processor; and
instructions stored in the memory and executable by the processor to cause the apparatus to:
identify one or more beam pair links between a first communications device and a second communications device, wherein the one or more beam pair links are established using a beam management procedure;
receive long-term feedback information from the second communications device after the one or more beam pair links are established using the beam management procedure;
identify a subset of directional downlink beams to use in a device-specific short-term downlink beam refinement procedure implemented by the first communications device based at least in part on receiving the long-term feedback information from the second communications device; and
perform the device-specific short-term downlink beam refinement procedure using the subset of directional downlink beams.

29. The apparatus of claim 28, wherein the instructions are further executable by the processor to cause the apparatus to:
localize a search for the device-specific short-term downlink beam refinement procedure based at least in part on receiving the long-term feedback information, wherein performing the device-specific short-term downlink beam refinement procedure is based at least in part on localizing the search.

30. An apparatus for wireless communication, comprising:
a processor;
memory in electronic communication with the processor; and
instructions stored in the memory and executable by the processor to cause the apparatus to:
identify one or more beam pair links between a first communications device and a second communications device, wherein the one or more beam pair links are established using a beam management procedure;
transmit long-term feedback information to the first communications device after the one or more beam pair links are established using the beam management procedure;
receive instructions from the first communications device regarding a device-specific short-term downlink beam refinement procedure based at least in part on transmitting the long-term feedback information; and
perform the device-specific short-term downlink beam refinement procedure based at least in part on receiving the instructions.

* * * * *